(12) United States Patent
Ma et al.

(10) Patent No.: US 12,534,389 B2
(45) Date of Patent: Jan. 27, 2026

(54) FAUCET WATER FILTER ASSEMBLY FOR WATER FILTRATION AND SKIN TREATMENT

(71) Applicant: Filterbaby LLC, Gaithersburg, MD (US)

(72) Inventors: Xin Ma, Gaithersburg, MD (US); Aaron Saxton, Gaithersburg, MD (US); Matthew Saxton, Gaithersburg, MD (US)

(73) Assignee: Filterbaby LLC, Gaithersburg, MD (US)

( * ) Notice: Subject to any disclaimer, the term of this patent is extended or adjusted under 35 U.S.C. 154(b) by 189 days.

(21) Appl. No.: 18/368,562

(22) Filed: Sep. 14, 2023

(65) Prior Publication Data

US 2024/0327243 A1 Oct. 3, 2024

Related U.S. Application Data

(60) Provisional application No. 63/492,725, filed on Mar. 28, 2023.

(51) Int. Cl.
| | |
|---|---|
| *C02F 1/00* | (2023.01) |
| *C02F 1/32* | (2023.01) |
| *C02F 1/44* | (2023.01) |
| *C02F 1/68* | (2023.01) |
| *E03C 1/02* | (2006.01) |
| *C02F 101/12* | (2006.01) |
| *C02F 101/20* | (2006.01) |
| *C02F 101/30* | (2006.01) |

(52) U.S. Cl.
CPC ............ *C02F 1/003* (2013.01); *C02F 1/32* (2013.01); *C02F 1/444* (2013.01); *C02F 1/68* (2013.01); *E03C 1/02* (2013.01); *C02F 2101/12* (2013.01); *C02F 2101/20* (2013.01); *C02F 2101/30* (2013.01); *C02F 2303/04* (2013.01)

(58) Field of Classification Search
CPC .............................. C02F 1/003; C02F 2307/06
See application file for complete search history.

(56) References Cited

U.S. PATENT DOCUMENTS

| | | | | |
|---|---|---|---|---|
| 4,686,037 | A | * 8/1987 | Lang | ...................... C02F 1/003 |
| | | | | 210/336 |
| 4,968,440 | A | * 11/1990 | Woodruff | ............. B01D 35/043 |
| | | | | 210/791 |
| 5,510,031 | A | 4/1996 | Knauf et al. | |

(Continued)

FOREIGN PATENT DOCUMENTS

| | | |
|---|---|---|
| CA | 126437 S | 10/2008 |
| CN | 2449625 Y | 9/2001 |

(Continued)

OTHER PUBLICATIONS

International Search Report and Written Opinion for PCT/US2024/022044 dated Jun. 12, 2024, 15 pages.

*Primary Examiner* — Reinaldo Sanchez-Medina
(74) *Attorney, Agent, or Firm* — Foley & Lardner LLP

(57) ABSTRACT

A water faucet filter assembly may include a horizontal orientation including a filter element viewable through a front cover of the filter assembly and an optional skin treatment element adapter that may receive a water-dissolvable, skin treatment element through which water filtered by the filter element passes before being dispensed to a user.

24 Claims, 20 Drawing Sheets

(56) References Cited

U.S. PATENT DOCUMENTS

| | | | | |
|---|---|---|---|---|
| 5,989,425 | A * | 11/1999 | Yonezawa | F16K 11/056 |
| | | | | 210/282 |
| 6,641,717 | B2 * | 11/2003 | Okano | B01D 29/603 |
| | | | | 210/93 |
| 8,152,142 | B2 * | 4/2012 | Hirakui | C02F 1/481 |
| | | | | 261/84 |
| 8,893,927 | B2 | 11/2014 | Olson et al. | |
| 9,004,290 | B2 | 4/2015 | Tanner et al. | |
| 10,329,134 | B2 | 6/2019 | Olson et al. | |
| 12,090,429 | B1 * | 9/2024 | Su | B01D 39/1623 |
| 2004/0055948 | A1 * | 3/2004 | Blum | C02F 1/688 |
| | | | | 426/66 |
| 2005/0035054 | A1 * | 2/2005 | Chu | C02F 1/003 |
| | | | | 210/460 |
| 2005/0098485 | A1 * | 5/2005 | Boyd | E03C 1/08 |
| | | | | 210/100 |
| 2009/0090661 | A1 * | 4/2009 | Tanner | B01D 35/30 |
| | | | | 285/8 |
| 2019/0060805 | A1 | 2/2019 | Jeon et al. | |
| 2021/0299600 | A1 | 9/2021 | Lee et al. | |
| 2021/0380447 | A1 | 12/2021 | Song | |
| 2022/0259067 | A1 | 8/2022 | Hu et al. | |

FOREIGN PATENT DOCUMENTS

| | | |
|---|---|---|
| CN | 104093669 B | 10/2014 |
| CN | 212389802 U | 1/2021 |
| CN | 112833206 A | 5/2021 |
| CN | 215559048 U | 1/2022 |
| CN | 217745987 U | 11/2022 |

\* cited by examiner

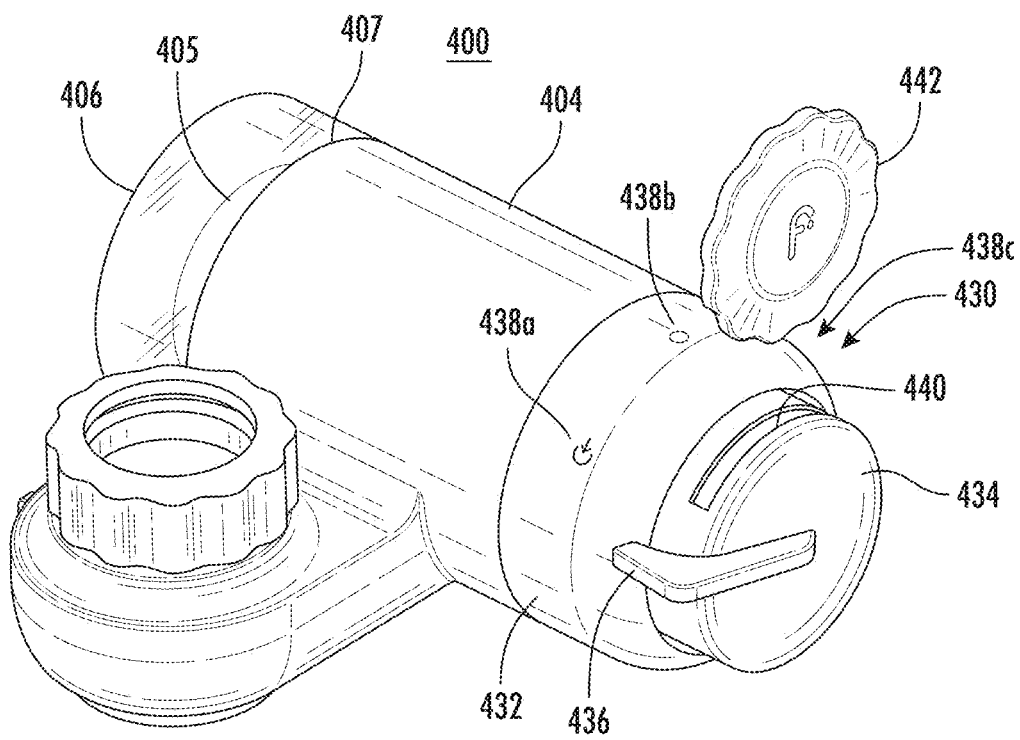
FIG. 4A
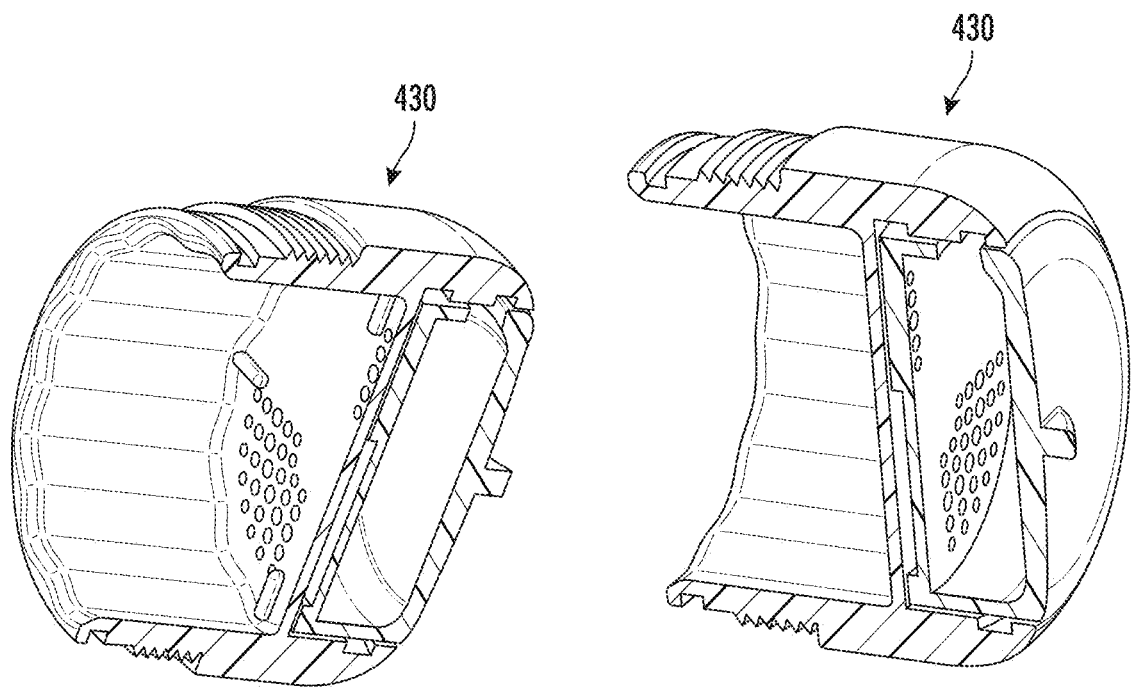
FIG. 4B
FIG. 4C

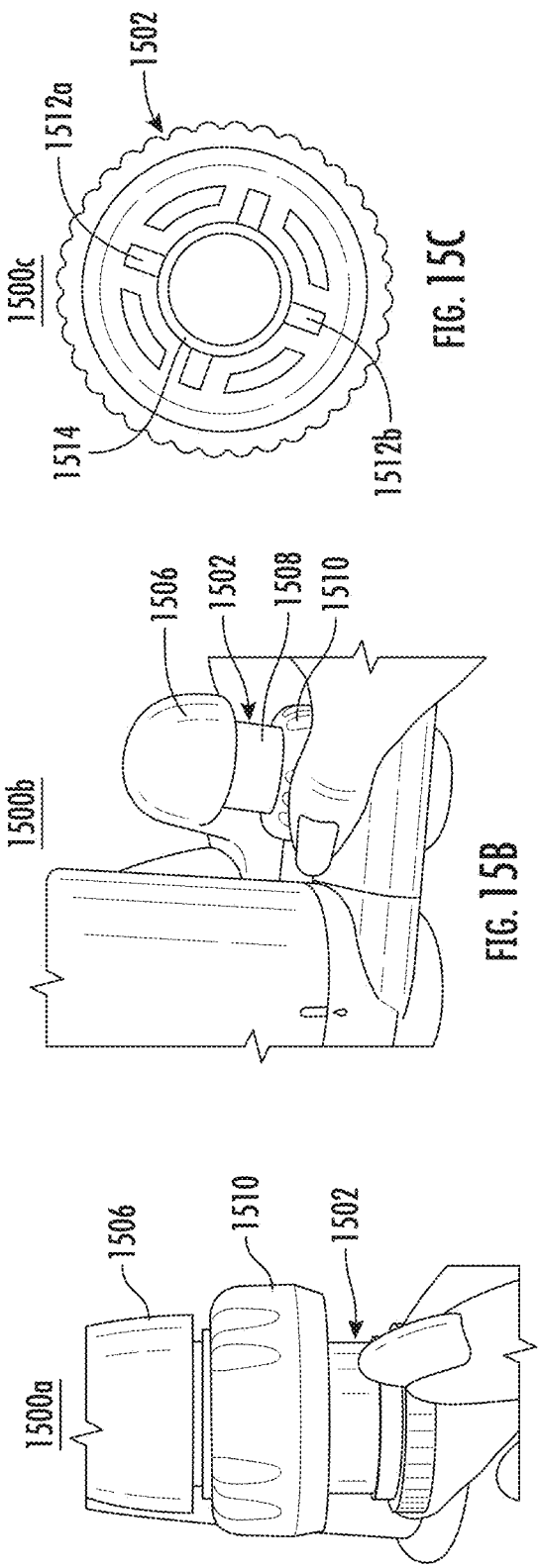

FAUCET WATER FILTER ASSEMBLY FOR WATER FILTRATION AND SKIN TREATMENT

RELATED APPLICATIONS

This Application claims priority to U.S. Provisional Application having Ser. No. 63/492,725 filed on Mar. 28, 2023; the contents of which are incorporated herein by reference in their entirety.

BACKGROUND

Faucet water filter assemblies are used to filter water, and generally include a filter element having a filter medium to remove particulate, chemicals, and other contaminants from the water. The filter medium may include a carbon filter element, a porous filter media, and/or a combination thereof. The filter assembly for consumer use is typically connected to a faucet, such as a sink or shower head, or located within a pitcher into which tap water from a faucet is dispensed. During use, the filter medium captures contaminants to provide clean, filtered potable water for a user to consume or otherwise use for personal hygiene purposes.

BRIEF DESCRIPTION OF THE FIGURES

A more complete understanding of the method and apparatus of the present invention may be obtained by reference to the following Detailed Description when taken in conjunction with the accompanying figures wherein:

FIGS. 4A and 4D show an isometric view of an illustrative faucet water filter assembly that may provide for both water filtration and skin treatment;

FIGS. 4B and 4C are isometric cross-sectional views of the skin treatment element adapter of FIG. 4A;

FIG. 15A is a front view of an illustrative water filter treatment adapter being installed onto a faucet;

FIG. 15B is a front view of a water filter assembly being installed onto a faucet using the water filter treatment adapter of FIG. 15A;

FIG. 15C is a bottom view of the illustrative water filter treatment adapter of FIG. 15A;

FIG. 15D is a front view of the illustrative water filter treatment adapter of FIG. 15A during installation onto a faucet using an illustrative installation tool;

FIG. 15E-1 is a bottom view of an illustrative installation tool for a water filter treatment adapter that includes at least one installation feature;

FIG. 15E-2 is a bottom view of an illustrative installation tool for a water filter treatment adapter that includes multiple interface features;

FIG. 15E-3 is a bottom view of an illustrative installation tool for a water filter treatment adapter that includes interface features along a perimeter region of the tool; and FIG. 15E-4 is a bottom view of an illustrative installation tool for a water filter treatment adapter that includes multiple interface features along different regions of the tool.

DETAILED DESCRIPTION

Before turning to the figures, which illustrate certain illustrative embodiments in detail, it should be understood that the present disclosure is not limited to the details or methodology set forth in the description or illustrated in the figures. It should also be understood that the terminology used herein is for the purpose of description only and should not be regarded as limiting.

Figure 1A:
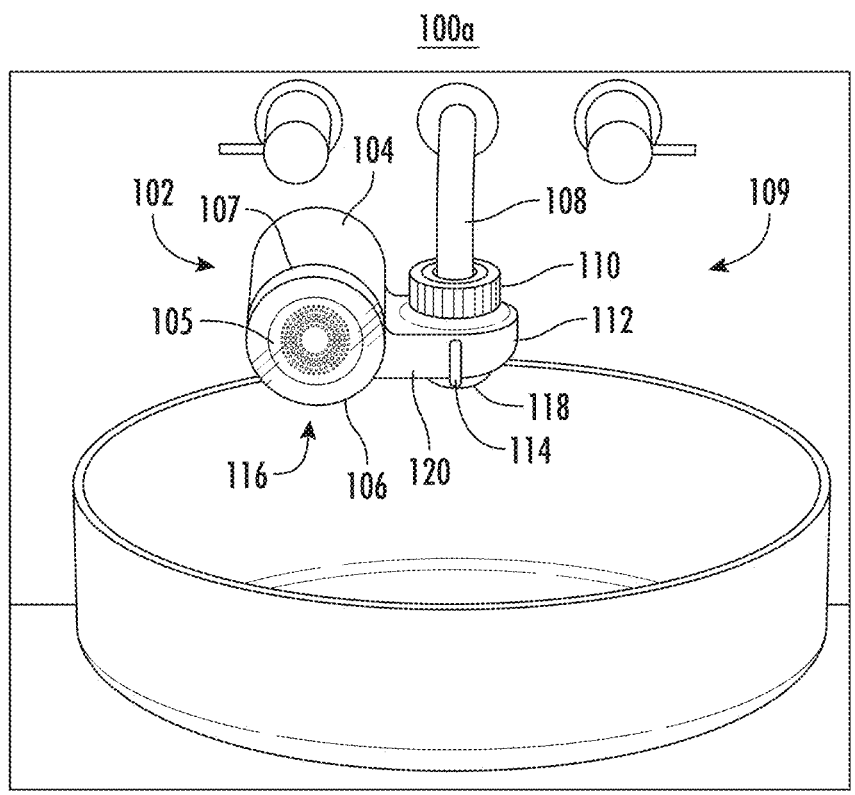
FIGS. 1A and 1B are an isometric view of an illustrative faucet water filter assembly inclusive of a water filter and connected to a faucet of a sink.
Figure 1B:
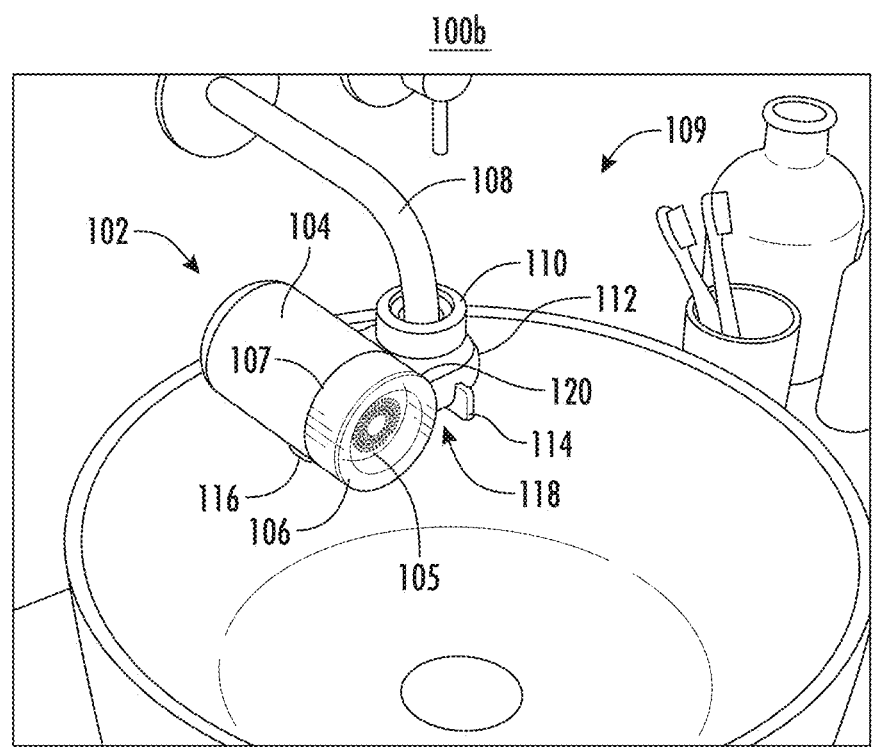

With regard to FIGS. 1A and 1B, an isometric view of illustrative sink environments 100a and 100b (collectively 100) inclusive of a faucet water filter assembly (or filter assembly) 102 is shown. The filter assembly 102 includes a housing 104 and a front cover 106 connected at a front edge 107 of the housing 104. As shown, the housing 104 is horizontally oriented (i.e., the longitudinal axis of the filter 104 has a horizontal orientation). As a result, the water filter 105 disposed within the housing 104 is horizontal such that water flows through the filter 105 horizontally. Alternative configurations (e.g., vertical) are possible. However, the horizontal configuration generally makes installation of the water filter 105 easier due to a user having a better view, especially if the water filter is front-loaded.

The front cover 106 may be configured to be removable or not removable from the housing 104. If the front cover 106 is removable from the housing 104, threads or other fastening features (e.g., clip, snap, quick connect, press and twist, etc.) may be utilized to connect and disconnect the front cover 106 from the housing 104. A gasket or other sealing member may be utilized to prevent water leakage between the front cover 106 and housing 104 at the front edge 107. If the front cover 106 is removable from the housing 104, the water filter 105 may be front-loaded by removing the front cover 106 from the housing 104. In an embodiment, a hinge or other securing mechanism (not shown) may be utilized to maintain the front cover 106 with the housing 104, thereby reducing the chance that a user will drop, damage, or lose the front cover 106. In an embodiment, the front cover 106 may be transparent, semi-transparent, or translucent to enable a user to see, at least in part, the water filter 105 and water flowing through the filter assembly 102. Although the front cover 106 is shown as having a flat front and a circular sidewall, each being transparent or semi-transparent, it should be understood that alternative shapes may be possible, such as a half-dome, trapezoidal, or any other geometric shape that enables a user to view the water filter 105 and water flowing thereinto. In an embodiment, the front cover 106 may be configured to function as an optical magnifier.

The filter assembly 102 may be connected to a water faucet 108 of a sink 109. The filter assembly 102 may include a rotatable threaded connector or adapter 110 that enables the filter assembly 102 to be detachably connected to the water faucet 108 via an adapter (see FIG. 5, for example). A water aerator or screen (not shown) may be removed from the water faucet 108 to enable an adapter to be connected such that the rotatable threaded connector 110 may be secured thereto and supported by the water faucet 108. As understood, there may be a dozen or more different faucet configurations such that different faucet adapters are used to engage the faucets and the rotatable threaded connector 110 may engaged thereto to enable the water filter assembly 102 to be used for most commercially available water faucets. The rotatable threaded connector 110 may have geometric or non-geometric features (e.g., wave profile) disposed around the perimeter thereof to enable a user to more easily grip and rotate the connector 110. Although shown as a rotatable connector 110, it should be understood that the connector 110 may have any other configuration that rotates, grips, snaps, quick connect, or mates in some other manner to interface with the water faucet 108.

The filter assembly 102 may further include a housing 112 that secures or supported by the rotatable threaded connector 110. The housing 112 may be formed of any material, such as plastic, metal, aluminum, ceramic, etc., that is suitably strong to withstand water pressures from water that flows from the water faucet 108 and without becoming distorted by hot and cold water temperatures of water from the water faucet 108. As shown, the housing 112 is directly beneath the faucet and extends horizontally such that the housing 104 is positioned to the side of the water faucet 108, thereby making it easier to access and view the sink 109. The housing 112 may support a control lever 114 along with a valve or other member (not shown) that is located within the housing 112 that has a closed state and an open state (along with partially open states therebetween) depending on position of the control lever 114. The filter assembly 102 may include a first filter nozzle 116 and a second filter nozzle 118. In an embodiment, when the control lever 114 is in the first state by being in a first position, the valve may be closed such that water is directed from the faucet 108 to flow through a water bridge pathway 120 from the housing 112 to the housing 104 in which the filter 105. The control lever 114 is illustrative and it should be understood that the control lever 114 may have alternative configurations, such as moving up and down, push button, dial, or any other mechanical configuration capable of controlling position of a valve or other structure that alters or prevents the flow of water, as further described herein. Moreover, in an embodiment, the control lever 114 may be electromechanical in that an electronic push button may be utilized to electromechanically control an electromechanical valve to change from a first state (e.g., filter applied) to a second state (e.g., no filter applied).

The housings 104 and 112 along with the water bridge pathway 120 that fluidly connects the housings 112 and 104 may be simultaneously formed and be monolithic (i.e., same material formed at the same time). Alternatively different components may be formed and attachment elements may be utilized to connect the different components. Although described as different features, the housings 104 and 112 and the water bridge pathway 120 may be considered a single feature or structure that forms one or more water pathway. In an open state of the control lever 114, water that enters the housing 104 is directed through the water bridge pathway 120, filtered by the water filter 105, and exited from a first water faucet 116. In the closed state of the control lever 114 (e.g., rotated around the housing 112 from a first position to a second position), water from the faucet 108 may exit the second filter nozzle 118 that outputs unfiltered water from the water faucet 108. In an embodiment, each of the first and second filter nozzles 116 and 118 may include aerators to aerate the water flowing therefrom.

In general, the faucet water filter assembly 102 may provide for filtering water for application to a person's skin (e.g., face, hands, feet, and/or other body areas). The faucet water filter assembly 102 is configured to connect to a variety of different faucet designs to enable a user to convert municipal water to a clean, filtered solution for consumption and optionally for topical application in performing skin treatments as part of personal hygiene, as further described herein. The faucet water filter assembly 102 includes a filter assembly housing 104 for supporting a replaceable water filter 105 along a water flow stream between the faucet 108 and a sink basin or other area 109. The faucet water filter assembly 102 may be configured for attachment to water faucets in bathrooms, kitchens, or other areas having access to a water supply. The faucet water filter assembly 102 is configured to selectively treat and/or filter water passing through the faucet water filter assembly 102 and/or to provide tap water directly through one or more nozzles 116 and 118 of the faucet water filter assembly 102 based on user inputs (e.g., filtered or unfiltered settings).

With regard to FIGS. 15A-15D, images of different steps 1500a-1500d for installing a water filter treatment adapter 1502 for supporting a faucet water filter assembly 1504 to a faucet 1506 are shown. The adapter 1502 may be elongated with one or more features, such as threads 1508, that engage the filter 1506. The adapter 1502 may provide a direct interface to the faucet 1506 (e.g., screw threads into corresponding threads of an aperture of the faucet 1506) along with supporting the faucet water filter assembly 1504. A threaded connector or collar 1510 may be disposed on the adapter 1502, and be configured to remain encircled about an extended shaft 1508 with a base 1514 that prevents the connector 1510 from separating from the adapter 1502. Once the adapter 1502 is secured to the faucet 1506, the faucet water filter assembly 1504 may be secured thereto by engaging the threaded connector 1510 to a feature (e.g., threaded water faucet inlet) on the assembly 1504. The adapter 1502 may be formed of plastic, metal, or any other material that is capable of supporting weight of the filter assembly 1504 with water contained therein along with water at hot temperatures. Moreover, it should be understood that the faucet adapter 1502 may have a wide variety of configurations that may be connected to As shown in FIG. 15C, a bottom view of the adapter 1502 is shown. The adapter 1502 defines opposing slots 1512a and 1512b (collectively 1512) that are disposed on opposite sides of a circular opening 1514. The slots 1512 may be used to secure a flat feature of a key, such as key 1516, that spans across each of the slots 1512. As previously described, as a user uses the key 1516 to connect and disconnect the adapter 1502 to and from the faucet 1506, because the faucet is disposed in or above a sink basin, it is difficult for the user to view or even feel the slots 1506. Conventional faucet adapters are metallic and then another filter-assembly specific adapter is connected thereto, which makes for installation of a faucet water filter assembly more challenging. By having an integrated adapter 1502 (i.e., one that connects to the faucet 1506 and enables the faucet water filter assembly 1504 to be suspended therefrom via the adapter 1510), installation of the faucet water filter assembly 1504 is easier. However, despite the adapter 1502 making the installation easier, having the opposing slots 1512 is still challenging because of an inability to view the slots 1512.

To improve the ability to attach and detach the adapter 1502 from the faucet 1506, a more intuitive key configuration may be provided. As shown in FIGS. 15E-1 to 15E-4 (collectively FIG. 15) are shown with different key features 1516a-1516d that are formed to integrate with bottom and/or side surface features of a faucet adapter. The key features 1516a may include a single feature 1518 that extends across the diameter of the key. The key features 1516b include multiple features 1520a and 1520b that extend across the diameter of the key in a crossing configuration. The key features 1516c includes indentations 1521a-1521d that extend inwards from a circular wall 1519. It should be understood that although the circular wall 1519 is shown to be smooth, that a different profile, such as shown in FIG. 5 with a wave profile, may be utilized. The key features 1516d include features 1522a-1522c (collectively 1522), which introduces a central circular feature 1522c that further helps align the key. Corresponding features would, of course, be included on a bottom or end surface (see FIG. 15C) of the faucet adapter 1502. It should be understood that a wide range of key features, including bottom and side surface features, may be provided on a key so as to make installation of the faucet adapter easier.

Figure 2A:
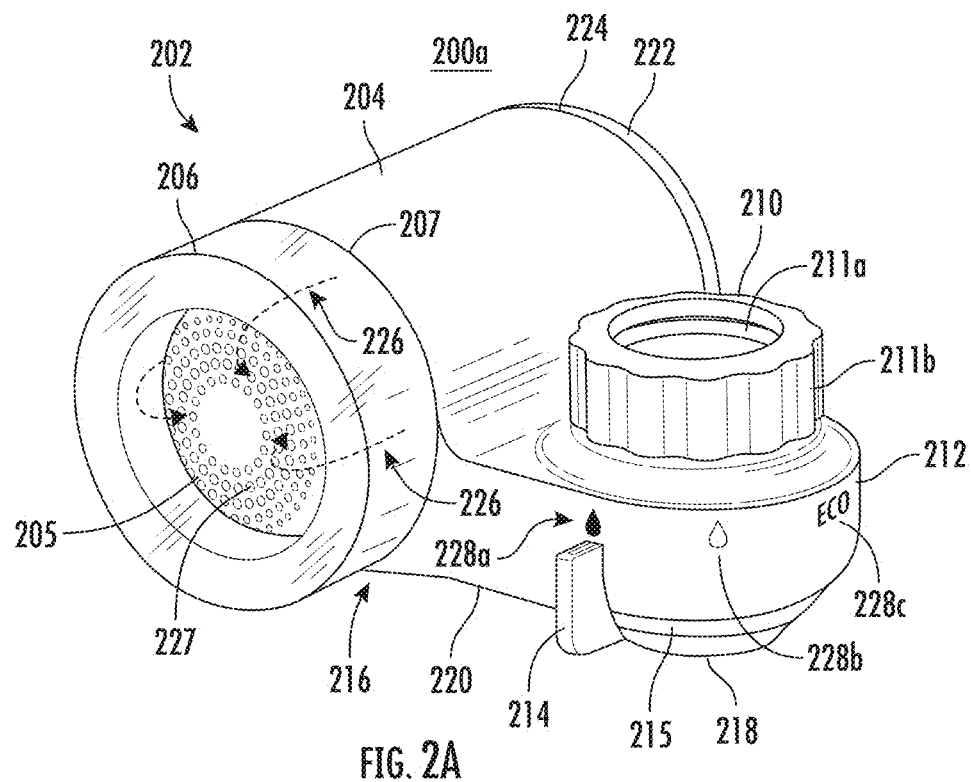
FIG. 2A is an isometric view of a faucet water filter assembly that is specially configured to support skin treatment for users.
Figure 2B:
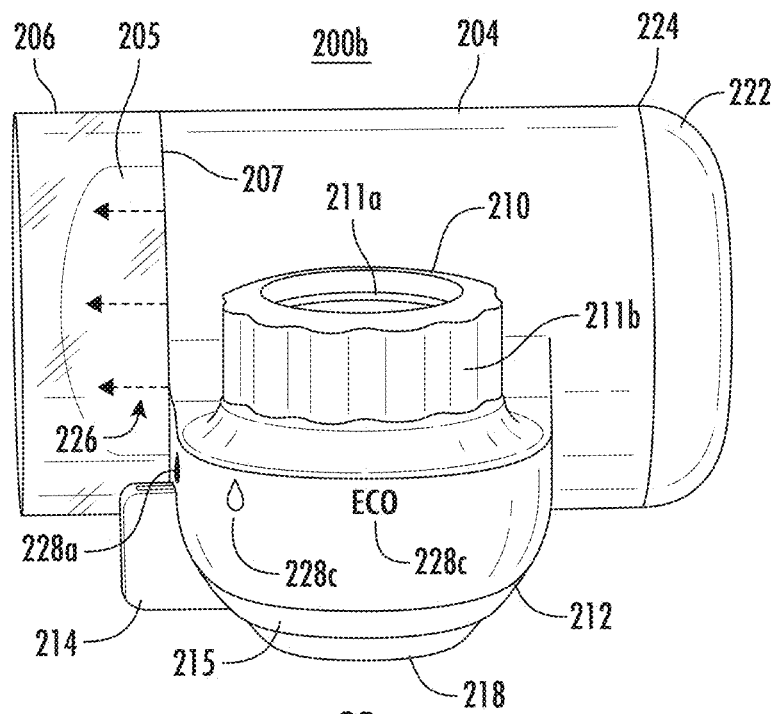
FIG. 2B is a side view of the faucet water filter assembly of FIG. 2A.

With regard to FIGS. 2A and 2B, isometric and side views 200a and 200b of a faucet water filter assembly 202 that is specially configured to support skin treatment for users is shown. As with the filter assembly 102 of FIGS. 1A and 1B, the filter assembly 202 includes a housing 204 and a front cover 206 connected at a front edge 207 of the housing 204. The water filter 205 disposed within the housing 204 is horizontal such that water flows through the water filter 205 horizontally. A rotatable threaded connector or adapter 210 may be configured to be connected to a faucet adapter the water faucet. There may be a wide range of faucet adapters to which the adapter 210 may connect. The rotatable threaded connector 210 may have geometric or non-geometric features (e.g., wave profile) disposed around the perimeter thereof to enable a user to more easily grip and rotate the connector 210. It should be understood that the connector 210 may be unthreaded and have any other connection mechanism, such as a quick connect.

The filter assembly 202 may further include a housing 212 that secures or supported by the rotatable threaded connector 210. The rotatably threaded connector 210 includes threads 211a on an inside wall of the connector 210 to connect to a faucet or adapter that connects thereto. The housing 212 may be formed of any material, such as plastic, metal, aluminum, ceramic, etc., that is suitably strong to withstand water pressures from water that flows from the water faucet 208 and without becoming distorted by hot and cold water temperatures of water from the water faucet 208. The housing 212 may support a control lever 214 along with a valve or other water flow restriction mechanism (not shown) that is located within the housing 212 that has an open state and a closed state (and different levels of openness) depending on position of the control lever 214. The filter assembly 202 may include a first filter nozzle 216 and a second filter nozzle 218. In an embodiment, when the control lever 214 is in the open state by being in a first position, the valve or other mechanism may be closed such that water from the faucet flows from the housing 212, through a water bridge pathway 220, and to the housing 204 in which the water filter 205 is positioned.

As further shown, a rear cover 222 may be configured to attach to the housing 204 at an edge 224. The rear cover 222 and housing 204 may be threaded such that the two components are able to be releasably attached to one another. A gasket or other feature (not shown) may be used to prevent leakage at the connection between the rear cover 222 and housing 204. In an embodiment, the rear cover 222 may have a physical connection, such as a hinge or other tether mechanism so that the two components 222 and 204 are held together. By being able to open and close the rear cover 222, a user may rear-load the water filter 205.

Water flow paths 226 shown within the front cover 206 indicate how water that enters into the housing 212, pass through the water bridge pathway 220, and enter into the housing 204 in which the water filter 205 is positioned flows into the water filter 205 via apertures or openings 227 defined by a housing of the water filter 205, as further described herein.

The control lever 214 may be configured to be rotated into multiple positions, such as positions 228a, 228b, and 228c. The number of positions may be based on the number of functions provided by the filter assembly 202. In the instant embodiment, a first position 228a may cause the filter assembly 202 to output filtered water through the first filter nozzle 216 beneath the housing 204 (see also first filter faucet 116 of FIG. 1), a second position 228b may cause the filter assembly 202 to output unfiltered water through the second filter nozzle 218 beneath the housing 212, and a third position 228c may cause the filter assembly 202 to output unfiltered water through the second filter nozzle 218 beneath the housing 212, but at a lower flow rate so as to be more ecologically friendly than when the control lever 214 is in the second position 228b. In an embodiment, as the control lever 214 moves between the second and third positions 228b and 228c, water flow rate may be transitioned (e.g., proportionally or non-proportionally) from a maximum to a minimum flow rate. That is, the filter assembly 202 may be configured with a valve that transitions from an open state to a partially closed state or vice versa.

Figure 2D:
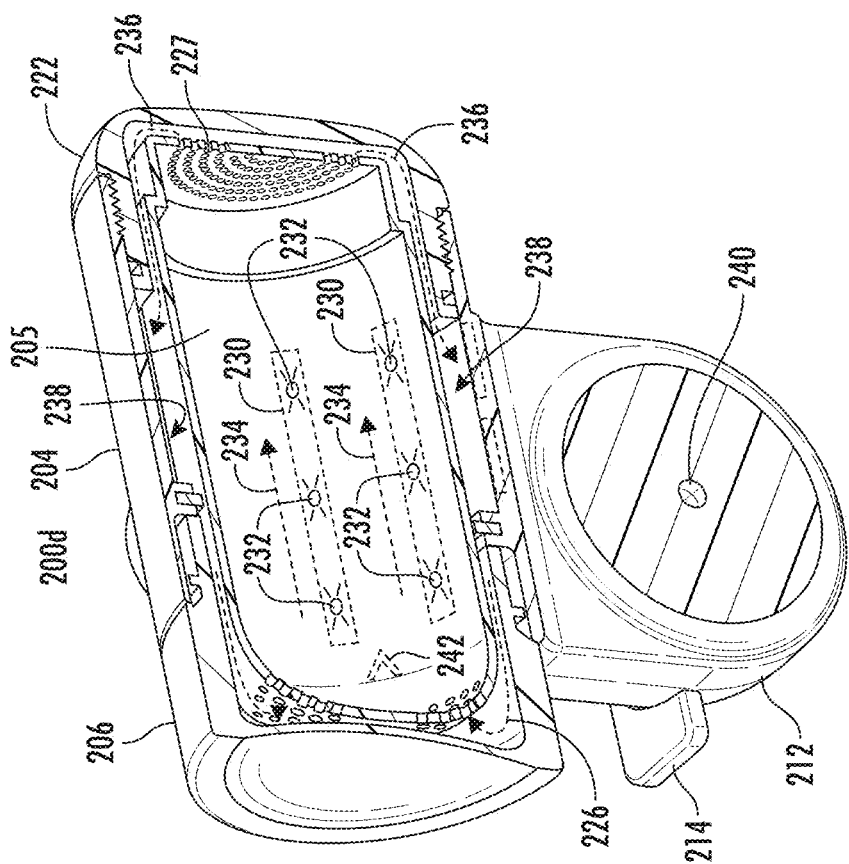
FIG. 2D is a side cross-sectional view of the faucet water filter assembly of FIG. 2A.
Figure 2C:
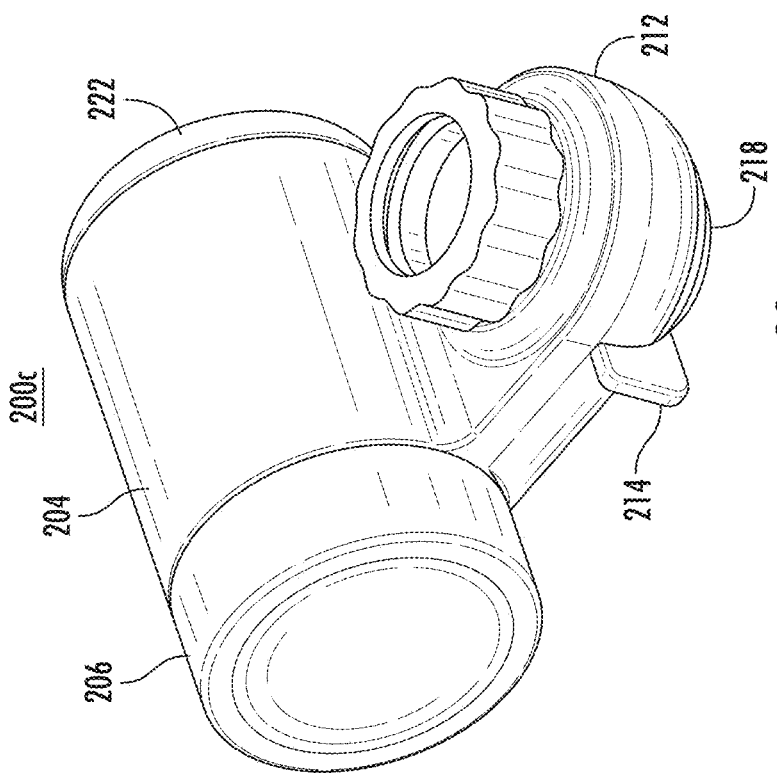
FIG. 2C is another isometric view of the faucet water filter assembly of FIG. 2A.

With regard to FIG. 2C, another isometric view of the faucet water filter assembly 200c of FIG. 2A is shown. The front cover 206 and rear cover 222 may have the same or similar configurations as shown in FIG. 2A, and may be removable or fixedly attached to the housing 204. The housing 204 may be a horizontal housing such that water flows horizontally. A control lever 214 may be disposed on a front side of housing 212 and is rotatable along the housing 212 so as to alter a valve or other mechanism within the housing 212 to enable or prevent water from flowing into the housing 204 for filtering the water. Alternative configurations of the control lever 214 may be utilized to control a valve.

With regard to FIG. 2D, is a side cross-sectional view of the faucet water filter assembly 200d of FIG. 2A is shown. The water filter 205 includes one or more illustrative windows 230 that may enable UV illuminators or lights 232 that are positioned within the housing 204 and directed towards the windows 230 such that UV light illuminated by the UV lights 232 may sterilize filter media (see FIG. 3) so as to reduce or eliminate bacteria, fungus, or other pathogens. The UV illuminators 232 may be selected to output one or more wavelengths known to kill certain pathogens. The windows 230 are shown to be elongated and extending longitudinally along a housing of the water filter 205. Other shapes, sizes, and configurations of window(s) may be utilized. The window(s), of course, should be transparent to UV light such that pathogens may be reduced or eliminated. In an embodiment, the housing of the water filter 205 may have a feature that causes the window(s) 230 to align with the UV lights 232 to ensure that the UV light enters the window(s) 230. Because a certain amount of time is needed to reduce or eliminate pathogens using UV lighting, the UV illuminators 232 are to illuminate the water filter 205 for a certain period of time, such as at least 20 seconds, at least one minute, at least two minutes, etc., and a timing circuit or module may be configured to turn ON and OFF the UV illuminators 232 periodically (e.g., two times per day), aperiodically (e.g., after usage of the water filter 205, in response to a user manually activating the UV illuminators 232 via a user interface), or otherwise.

Within the water filter 205, input water flow along the water path 226 may flow from a front to a rear end of the water filter 205, as indicated by water flow lines 234. The now filtered water exiting the water filter 205 via openings 227 may flow along flow path 236 via a water conduit 238 to flow out the nozzle 216. On the input side at the housing 212, if the control lever 214 is in the closed position, then the water flows via conduit 240 and out the nozzle 218. To force the water to flow through the water filter 205 when the control lever 214 is in the open or filter position, the housing of the water filter 205 may define the openings 227 at the front and rear ends and the side wall of the housing of the water filter 205 may contact or otherwise prevent water from passing to the side of the water filter 205 within the housing 204. A gasket or other leak prevention feature (e.g., threaded connection) may be utilized to minimize or eliminate the ability for water to pass the water filter 205 without being filtered thereby. In an embodiment, the housing of the water filter 205 may include a "key" or alignment feature (e.g., protrusion, recession, threads) 242 that aligns with a complementary feature in the housing 204, thereby causing the water filter 205 to be oriented and "seated" within the housing 204 in a predetermined orientation for UV light treatment, water flow control, and/or otherwise.

Front Loading Filter Assembly Design

With general regard to the faucet water filter assembly 202 may be configured to provide clean, treated water. The faucet water filter assembly 202 includes a housing and a replaceable filter element that filters or otherwise treats tap water passing through the housing to provide clean, filtered potable water.

The faucet water filter assembly 202 may include a physical (e.g., a mechanically-actuated, etc.) user-interface that allows a user to control operation of the faucet water filter assembly 202. In some embodiments, the faucet water filter assembly 202 is reconfigurable between at least three operating modes including, but not limited to, (i) a filtered water mode configured to direct a flow of water through the replaceable filter element, (ii) an eco-friendly and/or tap water mode configured to direct a portion of water received from the faucet through the filter element and another portion directly from the faucet to the nozzles, which can increase the service life of the filter element for a given flow rate of water through the faucet, and (iii) a regular tap water mode configured to bypass flow around the filter element and to provide untreated tap water to a user. In other embodiments, the faucet assembly may include additional, fewer, and/or different operating modes. In some embodiments, the user interface includes a rotatable knob, lever, or another mechanical control element that allows a user to select the operating mode of the faucet assembly. For example, the knob may be disposed on the forward end of the filter housing and may be rotatable along an axis extending vertically through an end of the faucet and/or inlet opening of the filter housing.

The faucet water filter assembly 202 is configured as a front load filter assembly in which the filter element is installed from a forward end (e.g., a user-facing end, a horizontally-facing end, etc.) of the filter housing. As will be further described, the replaceable water filter element is inserted into the filter housing from the front end into an interior cavity of the filter housing extending in a longitudinal direction between the front and opposing rear end of the housing (i.e., along an axis extending horizontally above a sink basin, parallel to a lower wall of the sink basin, etc.).

In some embodiments, the housing includes a forward or front cover 206 that is removable from the housing to access the water filter element (e.g., to remove and/or replace the filter element, etc.). The forward cover 206 may include a cylindrical cap or cover made from a transparent or semi-transparent material to enable viewing of the flow through the water filter element (e.g., viewing of tap water or untreated water entering perforations at a forward end of the filter element, etc.). The transparent cylindrical cover may also allow a user to view water flow passing into and/or out of the water filter element from above the faucet water filter assembly (due to the transparent sidewalls of the cylindrical cover) in addition to allowing a user to view water flow passing into the water filter element 205 from a forward end of the faucet water filter assembly.

Water flow entering the filter housing from the faucet passes into a first portion of the filter housing 212 that is substantially coaxially-aligned with the faucet and moves radially (e.g., horizontally) away from the faucet/inlet toward a second portion of the housing 204 that contains the water filter element 205. Referring to FIG. 2D, water flow may pass into the internal cavity of the housing 212, through openings that fluidly couple the internal cavity of the filter housing to the first portion 204, and axially toward a forward end of the filter housing (e.g., toward the forward cover 206). The forward cover 206 redirects flow into the water filter element 205, through perforations 227 at a forward end of a filter element housing of the water filter element 205, through a filter element medium within the filter element housing, thereby outputting filtered and/or treated water. The treated water exits the filter element housing through perforations along a rear end of the filter element housing where the flowing water is redirected (e.g., by a rear cover 222 of the filter housing) along an axial direction toward a nozzle 216 disposed beneath the filter housing 204. In some embodiments, the treated fluid passes across a treatment element, for example, across a dissolvable treatment disc or skin treatment ingredient (see FIG. 4A) before exiting the filter housing 204, as will be further described.

In some embodiments, the water filter element 205 and/or filter housing includes interface device that prevents use of non-genuine filter elements within the housing. The interface device may include an alignment "key" or other structural feature at an interface between the water filter element and the housing that is engageable by the water filter element so that the water filter element is properly installed (especially if a clear window that is to be aligned with UV lights). In other embodiments, the walls defining the internal cavity are formed in a flower petal shape (e.g., having a plurality of lobes, protrusions, etc.), or another suitable shape that are shaped complementary to an outer perimeter of the filter element housing.

Figure 3:
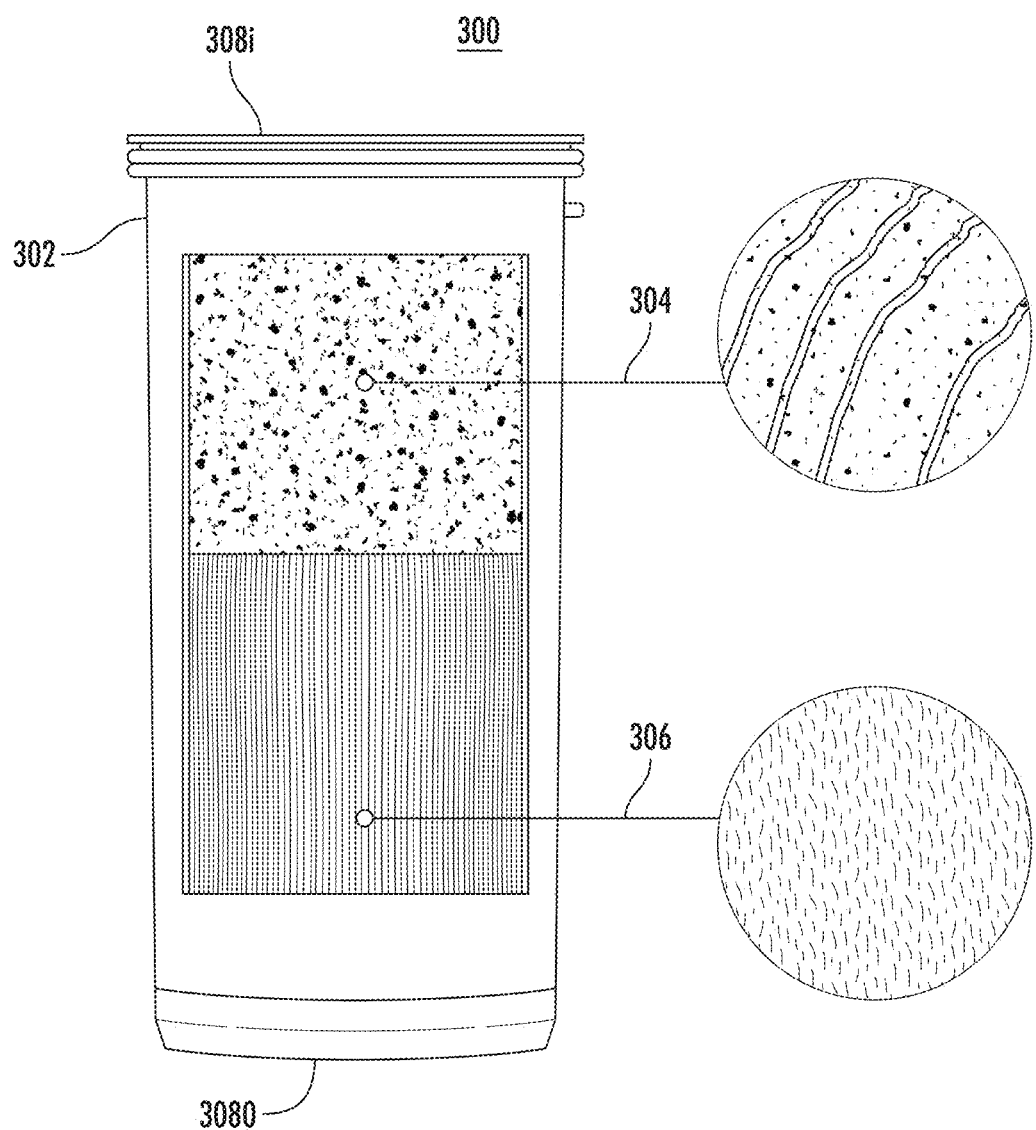
FIG. 3 is a side cross-sectional view of an illustrative, replaceable water filter element that can be used with the faucet water filter assembly of FIG. 2A.

With regard to FIG. 3, a side cross-sectional view of an illustrative, replaceable water filter element or water filter 300 that can be used with the faucet water filter assembly 200a of FIG. 2A is shown. The water filter 300 may include a filter housing 302 defining a hollow interior chamber configured to receive and house filter media 304 and 306, also described as a filter element chamber, therein. The filter media (e.g., carbon filter and ultrafiltration filter) 304 and 306 may include a chemical removal portion, a solids removal portion, or a combination thereof. For example, the filter medium 304 may include carbon fiber 304 that is configured to filter or otherwise reduce levels of contaminants, such as chlorine, lead, or other chemicals from the water. The filter medium 304 may be used to remove chemicals that are hazardous for human consumption as well as harmful to skin of a user. The filter medium 306 may be an ultrafilter or have ultra filtration fibers, hollow fiber filter, etc. so as to be configured to remove solids, such as microplastics, lead, or other metal, plastic, or other impurities resulting from corrosion or degradation of materials from water with the impurities passing through the filter element 300. In some embodiments, the filter medium 304 may be arranged at an inlet end 308i of the housing 302 of the water filter element 300 and the filter medium 306 may be positioned proximate to an outlet end 308o downstream from the carbon filter medium 304. In other embodiments, the arrangement and/or materials forming the filter media 304 and 306 may be different. For example, the carbon filter medium 304 may be sandwiched between filter medium 306 at the inlet and outlet ends 308i and 308o. As further provided herein, the filter media 304 and 306 may vary in configurations so as to accommodate different geographical regions having water with different contaminants and/or chemical compositions. The length and density of the filter media 304 and 306 may vary based on volume of waterflow, anticipated replacement frequency (e.g., monthly, quarterly, etc.), known levels of contaminants in a specific geographic region, dimensions of the housing 302, or otherwise.

Figure 4D:
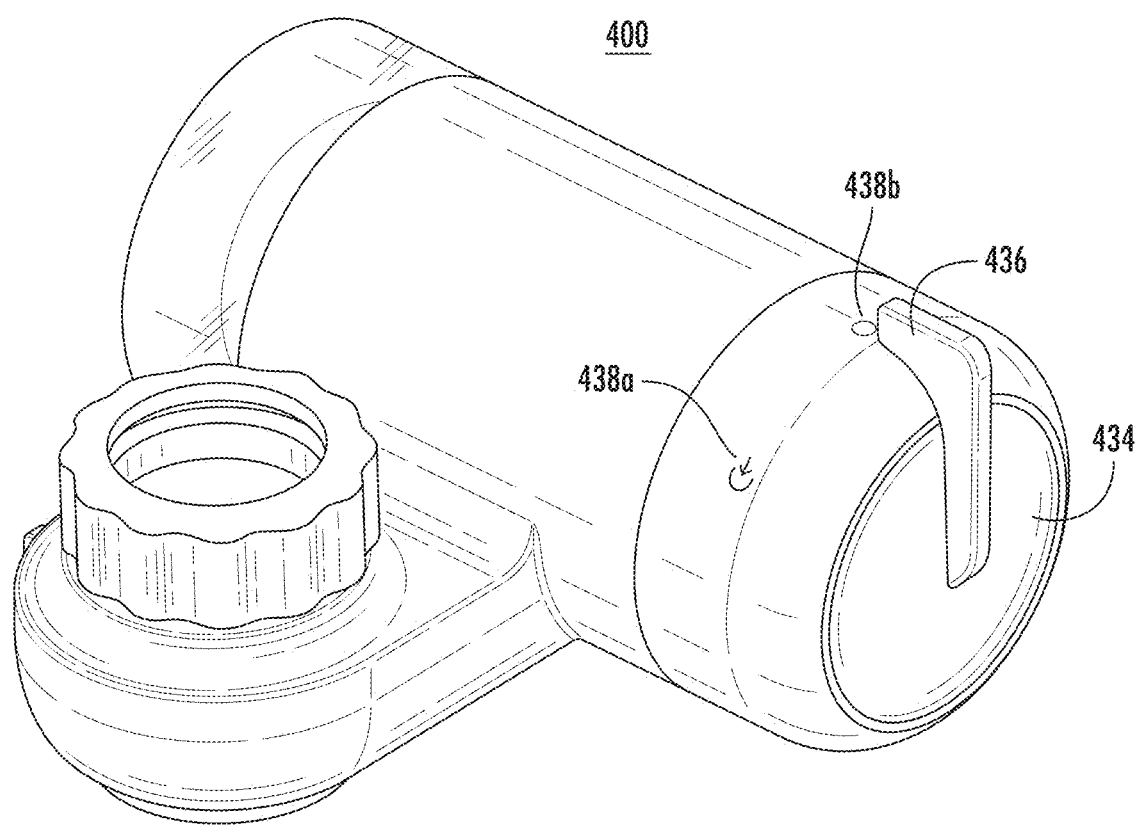
Figure 5:
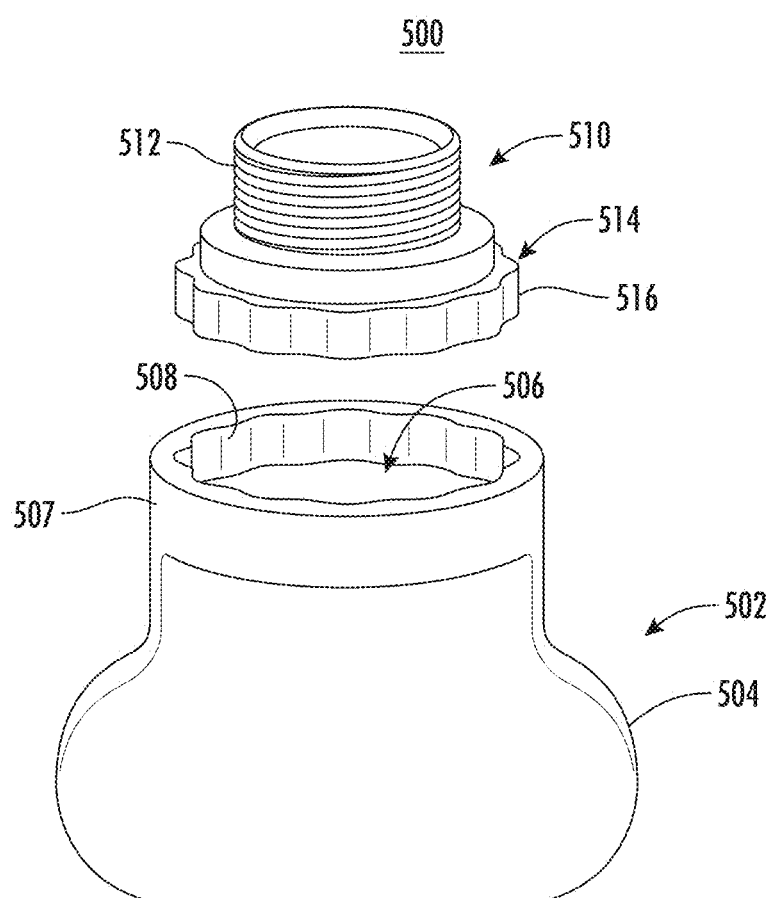
FIG. 5 is an isometric view of an illustrative filter faucet adapter and aerator head attachment element or adapter key set configured to assist a user in loosening and tightening the filter faucet adapter that is configured to support a faucet water filter assembly from a faucet of a sink, such as shown in FIGS. 1A and 1B.

With regard to FIGS. 4A and 4D, an isometric view of an illustrative faucet water filter assembly 400 that may provide for both water filtration and skin treatment is shown. The water filter assembly 400 may include a housing 404 in which a water filter 405 is disposed. A front cover 406, which may be transparent or translucent, as previously described, may connect to the housing 404 at an edge 407 of the housing 404. If the water filter assembly 400 is a front load water filter, then the front cover 406 may be releasably attached to the housing 404. Alternatively, if the water filter assembly 400 is a rear or side load, then the front cover 406 may be fixedly attached to the housing 404. In an embodiment, the front cover 406 may be opaque or partially opaque (e.g., having a transparent or semi-transparent portion or window(s)).

In an embodiment, a skin treatment element adapter or pod assembly 430 that is configured to attach to the housing 404 may be provided. The skin treatment element adapter assembly 430 may replace a rear cover, such as rear cover 222 of FIG. 2, thereby being an additional accessory that may be part of a faucet water treatment kit or be purchased as an additional feature option by a user from a baseline model of the faucet water filter assembly that comes with a rear cover. The skin treatment adapter assembly 430 may include a housing 432 that connects to the housing 404 and a rear cover 434 that is rotatably engaged with the housing 432. The rear cover 434 may be transparent, semi-transparent, translucent, or combination thereof to enable a user to see or partially see therethrough.

A control lever 436 may be extended from or connected to the rear cover 434 to enable a user to rotate the rear cover 434 in a clockwise and counterclockwise direction. In an embodiment, the control lever 436 may cause the rear cover 434 to rotate when the control lever 436 is rotated. The control lever 436 may be rotated from a first position 438a in which the rear cover 434 is considered to be in an open position or state, and a second position 438b in which the rear cover is considered to be in a closed position or state. The rear cover 434 may be attached to or engaged with the housing 432 with threads or other mechanism that enables the rear cover 434 to have an open and a closed position. In the open position, a slot 440 may be defined by a side wall of the rear cover 434 may be retracted from within a rear-most plane of the housing 432 of the skin treatment adapter 430, thereby enabling a user to insert a water-dissolvable skin treatment element 442 through the slot 440 to be retained by the rear cover 434. Once the skin treatment element 442 is fully inserted into the rear cover 434, the user may rotate the control lever 436 in a counterclockwise direction to cause the slot 440 to be retained within the housing 432 to enable a user to optionally treat water with the skin treatment element 442, as shown in FIG. 4D.

The skin treatment adapter assembly 430 may have skin treatment and no-skin treatment positions or states in which a valve or other fluid flow prevention mechanism (not shown) within the skin treatment adapter assembly 430 is controllable by a user by the control lever 436. In an embodiment, the no-skin treatment position is achieved by rotating the control lever 436 to the closed position 438b. In the skin treatment position 438c, which may be achieved by rotating the control lever 436 further clockwise to a skin treatment position 438c, the treatment element 442 is exposed to water flowing through the assembly 400 so as to flow against and past the water-dissolvable skin treatment element 442. The flowing water against and past the skin treatment element 442 causes skin treatment material or solution (e.g., vitamin(s), lotion, water softening agent, aloe vera, or other skin care ingredients) to be dissolved from the skin treatment element 442 and flow within the water stream from a nozzle beneath the housing 404, such as nozzle 116 of FIG. 1. In the no-skin treatment position 438b, the valve or other fluid flow prevention device may be closed, thereby preventing the water from flowing against and past the water-dissolvable skin treatment element 442. Without the water flow interacting with the skin treatment element 442, filtered water, but not water with skin treatment material contained therein, is output from the water filter assembly 400.

Although the skin treatment adapter assembly 430 is shown to be connected to a rear end of the housing 404, it should be understood that the skin treatment adapter assembly 430 may be configured to be positioned above, below, or to the side of the housing 404 and provide for the same or similar functionality. In another embodiment, a retractable device from the housing 404 may enable the skin treatment element 442 (or other any configuration thereof) to be inserted into or withdrawn from the housing 404 when a user desires to apply the skin treatment element 442 to the water flow of the filtered water.

In an embodiment, the skin treatment adapter assembly 430 may be configured to (i) maintain the valve (or other mechanism) in an open state while water is flowing, and (ii) automatically return to a closed state such that the next time the water is turned ON, the water-dissolvable skin treatment element is not in the water flow, thereby preventing a user from mistakenly drinking water with skin treatment solution therein. The valve or other mechanism may be maintained in the open position in response to water flow or water pressure dropping. Alternatively, a timer, such as a mechanical or electromechanical valve, may cause the valve or other mechanism to be automatically closed. Still yet, an electronic timer may be utilized to cause the valve or other mechanism to be automatically closed. In another embodiment, the skin treatment adapter assembly is configured to be manually positioned by a user to cause the control lever 436 to be in the open state or closed state such that the water-dissolvable skin treatment element 442 is to be in the waterflow or not be in the water flow.

Moreover, the skin treatment element adapter assembly 430 is shown for introducing ingredients of skin care to water flowing through the faucet water filter assembly 400. The skin treatment element adapter assembly 430 includes a subassembly that may be secured to the filter housing 404 to facilitate introduction of the water-dissolvable, skin treatment element 442 to the filtered water. The subassembly may be coupled to the housing in an area downstream from the water filter 405 so as to introduce treatment solution to clean, filtered water.

For example, after being filtered, water may be directed through the skin treatment element adapter assembly 430, and across the skin treatment, water-dissolvable treatment element 442 made from treatment material. The treatment material may include one or more of vitamin A, vitamin B, vitamin C, lotion, water softening agent, aloe vera, or another skin care ingredient. The treatment element 430 may be made entirely from treatment material and may be water-dissolvable into a stream of water passing across and/or through the skin treatment, water-dissolvable treatment element 430. For example, the treatment element 430 may be a compressed gel containing the skin treatment material. In some embodiments, the skin treatment element may be configured as a skin treatment disc having an outer perimeter forming a "flower petal" design, having rounded radial protrusions spaced at approximately equal intervals along the outer perimeter. In other embodiments, the skin treatment disc or element 430 may be formed in another shape.

It should be understood that the skin treatment element 442 may be made in various manners, where a higher density skin treatment element 442 may last longer, but produce less treatment material for a given volume of water flow, and where a lower density skin treatment element 442 may last shorter, but produce higher treatment material for a given volume of water flow. In an alternative embodiment, rather than the skin treatment element 430 being a solid, a compressed gel, semi-solid, or liquid may be utilized. If non-solid, a dispensing element (e.g., diffusion device, cartridge with one or more aperture, or other structural device configured to release a certain amount of solution over time and/or volume of water may be utilized to store the skin treatment composition. In an embodiment, the skin treatment element 442 may have a configuration that aligns with one or more features of the rear cover 434 or other feature(s) therein for alignment purposes or simply to ensure that the skin treatment element 442 is a genuine skin treatment element that complies with high-quality standards of the manufacturer. For example, a profile, thickness, opening, or otherwise of the skin treatment element 442 may be configured in such a way as to define a "key" for enabling the skin treatment element 442 to be positioned in the rear cover 434 via slot 440 or otherwise inserted therein.

In at least one embodiment, and generally speaking, the skin treatment element adapter assembly 430 includes a housing interface body 432 and an element receiving body or rear cover 434. The housing interface body 432 may be configured to couple the skin treatment element adapter assembly 430 to the filter housing 404. The housing interface body 404 may be threadably coupled to a rear end of the housing 404, which is on an opposite end of the filter housing 404 as the forward cover 406. In other embodiments, the housing interface body 404 may include a twist-lock connection or another form of quick-connect interface (e.g., clips, etc.) that removably couples the skin treatment element adapter assembly 430 to the filter housing 404. In yet other embodiments, the skin treatment element adapter assembly 430 may be fixedly coupled to the housing 404 or integrally formed with the filter housing 404 as a monolithic piece. Other configurations that perform the same or similar function may be utilized.

The element receiving body (e.g., rear cover 434) of the skin treatment element adapter assembly 430 may be configured to receive and secure the skin treatment element 404 in position with respect to the filter housing 404. The element receiving body 434 may define a portion of a receiving cavity configured to receive the treatment element 442 therein. In some embodiments, the receiving body 434 may include a knob, level, or other type of mechanical actuator to draw the receiving body 434 away from the housing, or otherwise expose, an element receiving slot (e.g., slot 440) through which a user may insert the skin treatment element 442. The element receiving body may also be configured to fluidly couple the interior cavity of the filter housing 404 to the receiving cavity (and the treatment element 442). The receiving body 434 may be threadably coupled to the housing interface body 404, or may include a "click" mechanism that allows a user to press against the receiving body (e.g., along an axial direction) to release the receiving body from the housing interface body 404.

In some embodiments, the element receiving body is configured to control introduction of the treatment element to water flowing through the filter housing 404 and/or an amount of material or chemical of the skin treatment element that is dispensed into water flowing through the housing 404. For example, the element receiving body 434 may be moveably (e.g., rotatably) coupled to the housing interface body or filter housing 404 and may be configured to selectively fluidly couple the interior cavity of the body to the receiving cavity (or to control a flow rate through the receiving cavity that contains the treatment element).

Referring to FIGS. 4B and 4C, isometric cross-sectional views of the skin treatment element adapter 430 of FIG. 4A are shown. The adapter 430 may have a structure that enables the element receiving body 434 to be rotated such that a slot 440 may be accessible and inaccessible so as to enable a skin treatment element 442 to be disposed within the element receiving body 434.

Referring to FIGS. 4B and 4C, the element receiving body may include a first interface disc that engaged a second interface disc defined by an end wall of the housing interface body. The first and second interface discs may be perforated in one or more quadrants and may also include non-perforated portions. The element receiving body may include a knob, lever, or another mechanical or electromechanical actuator that is operably coupled to the first interface disc and is configured to cause rotation of the disc to vary the flow area between the interior cavity of the filter housing and the receiving cavity (and to thereby vary the flow rate through the receiving cavity and the amount of treatment ingredient released into the water during operation). For example, the mechanical actuator may be configured to bring the perforation portion of the first and second discs into alignment or partial alignment. The mechanical actuator may be disposed on the receiving body, along a rear end of the filter housing, and may rotate about a central axis of the receiving cavity.

In some embodiments, the skin treatment element adapter includes an interface feature to prevent the use of non-genuine treatment element designs. For example, the skin treatment disc could include perforations that engage with a pin or other type of keying element during installation of the skin treatment element. In other embodiments, the skin treatment element (e.g., the skin treatment disc) may have a shape that is complementary to a shape formed along an inner perimeter wall of the receiving cavity (e.g., a disc having a "flower shape" along its outer perimeter interfacing with corresponding features or wall shapes in cavity to prevent full insertion of non-genuine skin treatment discs, etc.).

The skin treatment element adapter and/or assembly may be configured to determine whether a skin treatment element is present and/or an indication of an amount of treatment material remaining. For example, in some embodiments, the element receiving body includes a transparent or semi-transparent (e.g., translucent) cover and/or window that allows a user to view the skin treatment element through the receiving body. In some embodiments, the adapter includes a sensor, such as an optical, resistive, chemical, and/or capacitive sensor to determine whether the skin treatment element, in whole or in part, is present or dissolved. In some embodiments, the adapter includes multiple sensors which may be, for example, disposed in quadrants of the receiving cavity to determine whether portions of the skin treatment element have dissolved. The adapter and/or filter assembly may be configured to determine an amount of treatment material remaining based on an average sensor data from each quadrant of the receiving cavity. In some embodiments, the adapter and/or filter assembly may include or otherwise generate a notification signal that is configured to indicate the amount of remaining treatment material and/or to notify the user when treatment material has partially or fully dissolved. For example, the notification may include an optical/LED indicator that is coupled to the one or more sensors and/or an audible indicator (e.g., a buzzer, a beeper, etc.) that generates an alarm or audible notification when material has partially or fully dissolved.

With regard to FIG. 5, an isometric view of an illustrative filter faucet adapter and aerator head attachment element or adapter key set 500 configured to assist a user in loosening and tightening the filter faucet adapter that is configured to support a faucet water filter assembly from a faucet of a sink, such as shown in FIGS. 1A and 1B, is shown. The filter faucet adapter and adapter key set 500 includes a key 502 that includes a handle 504 that a user grips and an indentation 506 defined by a wall 507 that is located at an end of the handle 504. The wall 507 may be circular and include an inner wall 508 with a shaped profile. As shown, the shaped profile may be a wave pattern, but it should be understood that any other shape profile (e.g., geometric or non-geometric) may be utilized. A filter faucet adapter 510 may include an extended circular (or other shape) wall 512 that define threads on an outside surface to enable the adapter to be screwed into a faucet aperture after removing an aerator therefrom. A base or flange at an end of the circular wall 512 may have a complementary shaped profile 516 to that of the shaped profile of the inner wall 508 of the key 502, thereby enabling the inner wall 508 of the key 507 to engage with the outside flange with the complimentary shaped profiles 508 and 516 in alignment to support rotating the adapter into and out of the faucet aperture. The key 502 may be considered a "glove" key in that the key 502 fits around the base 514 of the adapter 510. Because a user cannot easily view the bottom of the base 514 of the adapter 510, having the key 502 configured as a "glove" key helps overcome the typical problem of visibility of the bottom of the base 514 when installing and removing the adapter 510 from the filter faucet.

More generally, the adapter key 502 is shown that facilitates installation of an aerator or faucet connection adapter for a faucet water filter assembly. The adapter key 502 may be uniquely shaped to match a corresponding pattern on an aerator. The adapter key may include an elongated handle and a head-adapter interface that is configured to engage with a faucet adapter. The head-adapter interface may include the recessed area 506 formed into the adapter key 502. An inner radial surface or wall 508 of the recessed area 506 may define a flower petal shape or another shape that corresponds with a shape or profile 516 formed by an outer perimeter of the base 514 of the faucet adapter 510.

Figure 6:
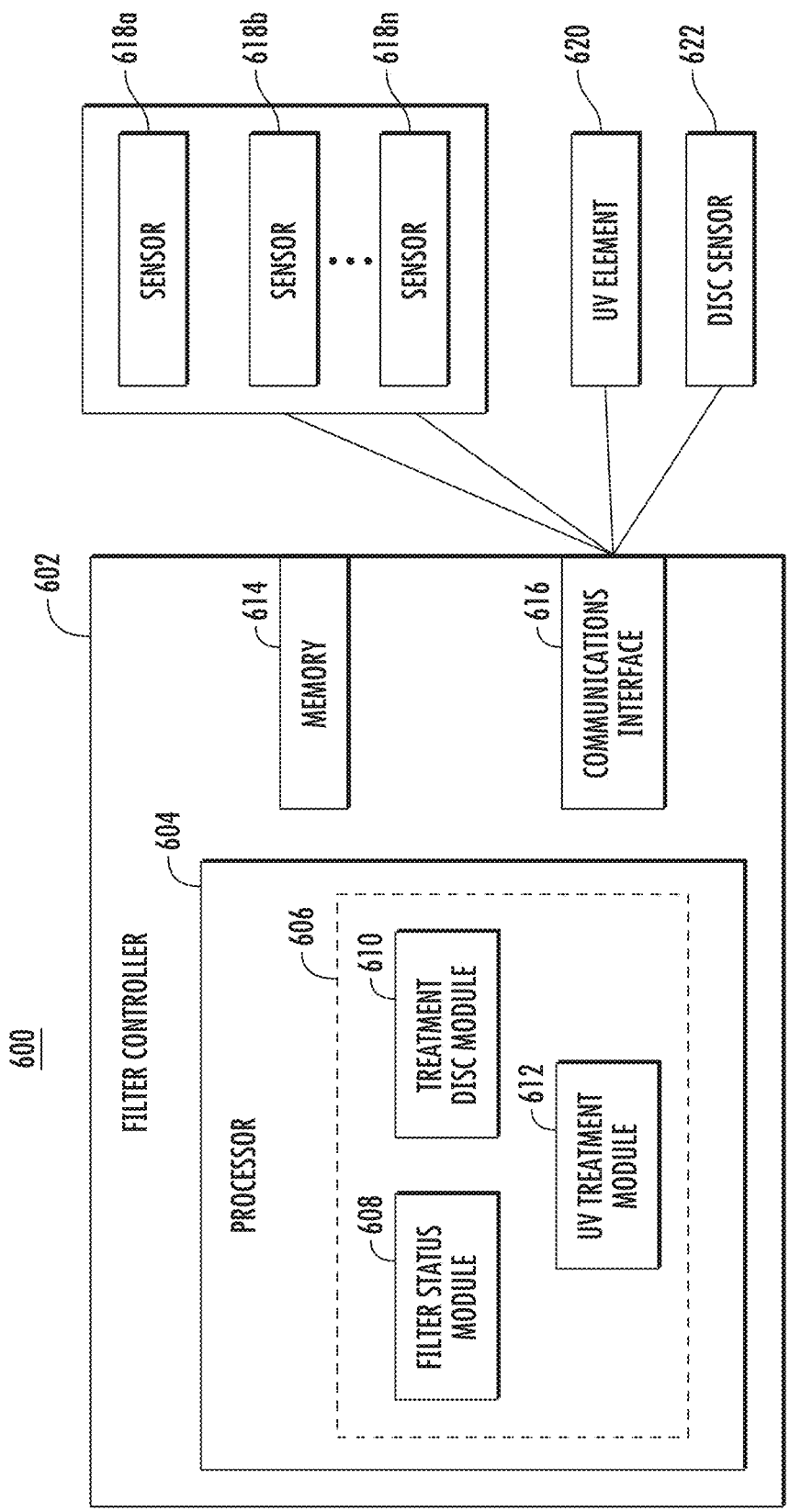
FIG. 6 is a block diagram of an illustrative water filter controller that can be used with the faucet water filter assembly of FIG. 2A.

With regard to FIG. 6, a block diagram of an illustrative water filter controller 600 that can be used with the faucet water filter assembly of FIG. 2A is shown. The controller 600 may include at least one processor 604 configured to execute software and/or firmware (collectively software) 606. The software 606 may include a filter status module 608, treatment disc module 610, and ultraviolet (UV) treatment module 612. It should be understood that other functions and software for executing those functions by the processor(s) 604 may be included as part of the controller 602. The controller 602 may further include a non-transitory memory 614 configured to store data and/or software and a communications interface 616, each of which may be in communication with the processor(s).

The communications interface 616 may be in electrical communication, either wireless or wired, with one or more sensors 618a-618n (collectively 618), UV element 620, and disc sensor 622. The sensors 618 may be used for sending a number of physical parameters of functionality of the faucet water filter assembly (e.g., water volume flow, water flow speeds along a water path, water impurities, settings of the faucet water filter assembly, etc.), along with consumable components (e.g., filters, treatment elements, etc.), and water quality pre- and/or post-filtering (e.g., contaminants within water before and after passing through the water filter). The UV element 620 may be disposed within the filter(s) and/or other locations within the faucet water to treat (e.g., reduce or kill) pathogens, such as fungus and bacteria, therein. The disc sensor 622 may be an optical, proximity, impedance, capacitive, or other sensor type (e.g., element sensor to sense elements released by the disc dissolving) configured to monitor an amount of the treatment element (e.g., skin treatment element 442 of FIG. 4) remains. Each of the sensor(s) 618 and disc sensor 622 may be actively polled (e.g., periodically or aperiodically) or communicate sensor measurements to the processor(s) 604 for processing by the software 606.

The filter status module 608 may be configured to monitor and report status of the faucet water filter. Monitoring the status of the filter may include monitoring water flow pressures, color of filter(s), contaminants in water (e.g., contaminants in water flowing into the water filter, contaminants in water flowing out of the water filter, differential of contaminants flowing in and flowing out of the water filter, etc.). The status of the filter may further include monitoring a battery level, if a battery is used to power electronics of the water filter. In reporting status of the faucet water filter, an electronic display (e.g., LCD display) or display panel (e.g., LEDs) 624 may be configured to display indicator(s) of status of the various features and functions being sensed by the sensor(s) 618 and 622. If a water flow sensor is one of the sensors 618, then the filter status module 608 may determine filter status based on volume of water that has flowed through the water filter(s) as opposed to a more direct measurement (e.g., color). The filter status module 608 may further be configured to determine water pressure drops or water flow speed differentials to provide an indication as to how clogged the water filter has become due to dirt or other solids being collected by the water filter. In an embodiment, the filter status module 608 may be configured to monitor amount of time that water flows across the water filter in determining status of the water filter. The amount of time may be the only parameter or may be one of two or more parameters that the filter status module 608 uses in determining status of the water filter.

The treatment disc module 610 may be configured to monitor the disc sensor 622 that is sensing the treatment disc (e.g., skin treatment element 442). The treatment disc module 610 may determine status (e.g., size) of the treatment element and display a notification, such as "OK" or "Replace"). In an alternative embodiment, the treatment disc module 610 may be configured to monitor water flow volume over time to determine how much water flows across treatment element, thereby providing the ability for the treatment disc module 610 to estimate how much of the treatment element remains. If the skin treatment element 442 is a gel or liquid, an alternative type of sensor (e.g., impedance, level, etc.) may be utilized.

The UV treatment module 612 may be configured to operate continuously, periodically, or aperiodically to drive UV light(s) (e.g., LEDs) to sterilize a water filter or any other surface within the faucet water filter assembly. The UV light(s) may output UV or other wavelength of light that is known to kill one or more types of pathogens. In operation, the UV treatment module 612 may be configured to generate a drive signal that is communicated to the UV element 620 via the communications interface 616. UV light (or other wavelength) may be incident on surfaces, such as the water filter via transparent region(s) along a housing of the water filter so as to reduce or eliminate pathogens on the filter fibers. In an embodiment, a user interface may be configured to enable a user to manually control the UV element 620. The UV element 620 may be part of the faucet water filter assembly (e.g., disposed at the water filter), part of an adapter (e.g., integrated into a front or rear cover that is an accessory), or integrated within the water filter itself. If integrated into the water filter, then electrical contacts may be used to communicate electrical signals to and from the filter controller 602 and UV element 620.

More generally, the control system 600 for a faucet water filter assembly may include a water filter controller that is configured to (i) monitor a status and/or condition of the water filter element during operation, (ii) monitor a status of the skin treatment element, and (iii) operate a UV light system to kill fungus and bacterial growth within the faucet water filter assembly. The filter controller may include a processor and memory. The memory may store machine-readable instructions that, when executed, cause the processor of the filter controller to perform the various operations described herein. The water filter controller 602 may also include a communications interface configured to receive and transmit data to/from at least one water filter sensor.

In some embodiments, the filter controller 602 is operably coupled to a UV light system including a UV element (e.g., UV light element, etc.). Referring to FIG. 2D, the UV element may be disposed within the filter housing and may be arranged to direct UV light toward the water filter element. In some embodiments, the water filter element housing includes window(s) (e.g., a transparent plastic, etc.) that form part of the filter element housing (e.g., that extend in the longitudinal direction along the filter housing, etc.) to facilitate transmission of UV light through the filter housing and onto the filter medium. Such an arrangement can enable prolonged exposure of the filter medium to UV light during operation. In other embodiments, the UV light element(s) 620 may be disposed within the filter element housing (e.g., along the walls of the filter element housing, etc.). For example, the filter medium within the water filter element housing may be replaceable so that the same UV light element 620 can be utilized throughout the lifetime of the faucet water filter assembly. The filter controller 602, via a UV treatment module and/or circuit, may be configured to activate the UV light element 620 periodically (e.g., 1-2 times per day, etc.) and to control the UV light element to maintain light application for a 1-2 minute period, or another threshold application time to ensure near-complete destruction of fungus and/or bacteria growth within the filter element housing (and/or within the interior cavity of the filter housing).

The control system may include a battery pack (e.g., a rechargeable battery pack, disposable batteries, etc.) and/or may utilize water flow through the filter housing to power operation of the UV light elements and/or recharge the battery pack. For example, an electromagnet charger using a flywheel, for example, may be spun by water flow through the faucet water filter assembly to generate electricity for recharging the battery.

In some embodiments, the filter control system 600 includes a water filter status module 608 that is configured to determine a condition of the water filter element. In some embodiments, the filter controller 602 may be communicably coupled to at least two disparate water filter sensors 618 that are disposed within the faucet water filter assembly. The water filter status module 608 may be configured to determine the condition based on sensor data from the water filter sensors 618. The water filter sensors 618 may include, but not limited to, one or more of:

(i) a flow sensor configured to measure and generate sensor data indicative of a total amount of water flow that has passed through the filter element;

(ii) a timer configured to measure and generate sensor data indicative of an amount of time that has elapsed since a new water filter element was installed into the faucet water filter assembly;

(iii) a pressure sensor configured to measure and generate sensor data indicative of a pressure drop across the water filter element; and (iv) a flow rate sensor configured to measure and generate sensor data indicative of a flow rate passing through the water filter element.

The water filter status module may be configured to determine various filter conditions based on the sensor data from the water filter sensors. For example, the water filter status module may be configured to determine a type of contaminant (e.g., chlorine, phosphorous, etc.) and/or solids (e.g., dirt, iron, etc.) being introduced into the faucet water filter assembly from the faucet based on changes in measured pressure drop over time. The water filter status module may be configured to determine an amount of bacterial growth based on sensor data from the flow rate sensor and/or timer, either alone, or in combination with sensor data from the flow rate sensor. By using multiple sensors, the water filter controller can provide a more accurate assessment of the condition of the water filter element.

In some embodiments, the water filter status module 608 is configured to generate a notification to alert a user that the water filter element (and/or other consumable element) needs to be changed. The water filter status module may be configured to generate a notification (e.g., illuminate an LED indicator, generate an audible alert, synthesized voice, etc.) in response to a determination that the filter condition satisfies (e.g., exceeds or is within a threshold value of, etc.) a condition threshold. The condition threshold may include one or more conditions (e.g., color, flow rate, time of use duration, etc.). In an embodiment, the water With regard to FIG. 7A, a block diagram of an illustrative user interface (e.g., a webpage) 700*a* for customization of a faucet water filter assembly and skin treatment element based on location (contaminant(s)) and skin type as input parameters, showing a first user input selection is shown. The user interface 700*a* may provide for a dynamic filter element selection in that a system that processes inputs into the user interface 700*a* may dynamically select a filter that aligns with the user inputs. The user interface 700*a* may include a list of user selectable parameters 702, which may include, but not limited to, parameters "Select your location" 702*a*, "Select contaminant" 702*b*, and "Select skin type/condition" 702*n*, where each parameter has a corresponding selection feature 704*a*-704*n* (collectively 704) that enables a user to select from a pull-down menu or any other graphical user interface selection feature 705. As shown, the user has selected a location of CA 706*a*. The user may thereafter submit a contaminant and skin type/condition via the selection features 704*b* and 704*n*. It should be understood that the user interface 700*a* may support submission of additional and/or alternative locations (e.g., more levels of detail than simply state, such as zip code, county, city, street, actual address) and skin types and conditions.

Figure 7A:
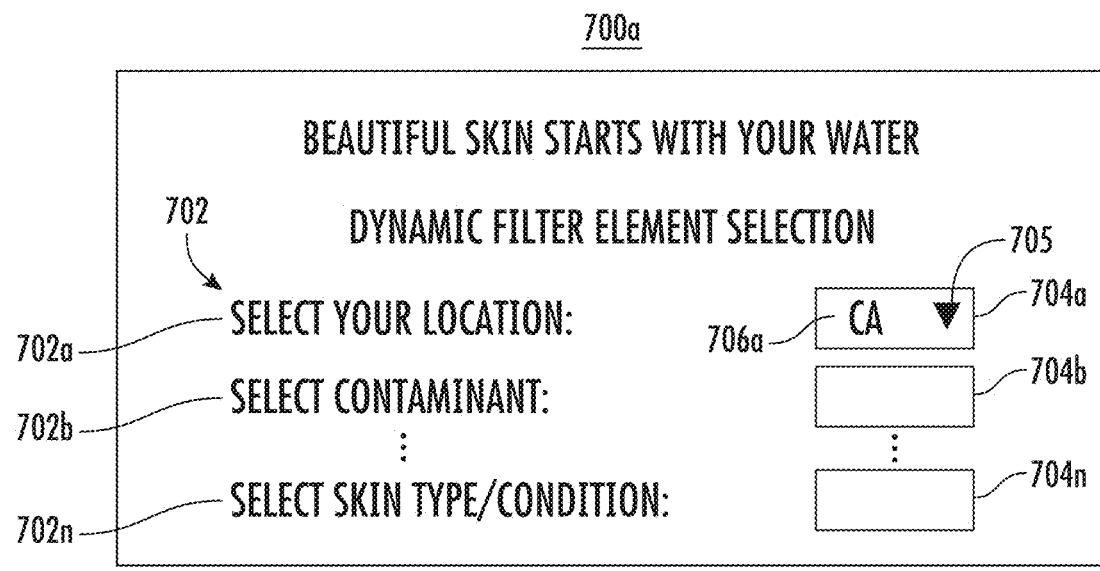
FIG. 7A is a block diagram of an illustrative user interface (e.g., a webpage) for customization of a faucet water filter assembly and skin treatment element based on location (contaminant(s)) and skin type as input parameters, showing a first user input selection.
Figure 7B:
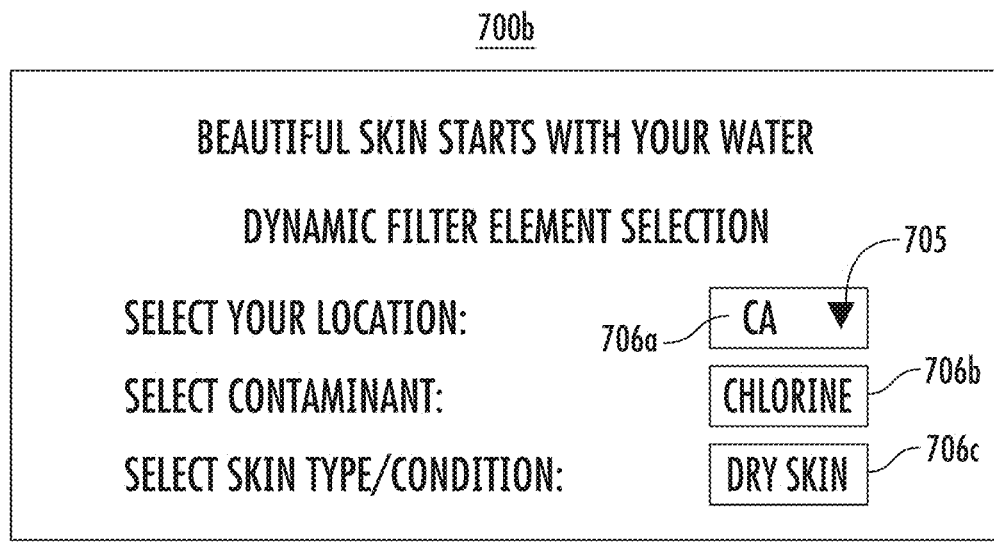
FIG. 7B is a block diagram of the illustrative user interface of FIG. 7A, showing a second user input selection.

With regard to FIG. 7B, a block diagram of the illustrative user interface 700*b* of FIG. 7A, showing a second user input selection is shown. The user has selected (or entered) a contaminant of chlorine 706*b* and dry skin 706*c*. Thereafter, the system may use these submissions to dynamically select and present for selection a specific water filter from amongst multiple available water filter types that matches or most closely matches water filters that align with the inputs from the user. A dynamic matching tool may be created based on test studies and historical information about how well certain water filters and treatments work with the various user selectable parameters 702. Such studies may be performed scientifically (e.g., measure contaminant contents in filtered water) or empirically (e.g., by enabling users who use certain water filters to submit ratings for how well those filters perform on his or her skin). In an embodiment, the user may submit demographic information, such as age, race, gender, or otherwise, and the system may automatically select a water filter that most closely aligns with those entries. Of course, location, contaminants, skin types, and demographic information may all be factored into the dynamic selection of the water filter.

Moreover, a water-dissolvable, skin treatment element customization system may include:

(a) a water-dissolvable, skin treatment element customization system that is configured to dynamically select a water filter and/or skin treatment element based on user inputs. The system may be configured to select the water filter and/or skin treatment element based on at least two user input parameters. The user input parameters may include, for example, (1) a geographic location (e.g., a city, a state, etc.) and (2) the top one or two types of contaminants and/or chemicals that are of concern to the user (or that are more prevalent in the household). In other embodiments, the system may include additional, fewer, and/or different input parameters. For example, the user input parameters may include time of year, age of residence, seasonal information, or other parameters. The system may be configured to generate and solicit user input via an user interface (e.g., an app, a web interface, etc.).

(b) a customization system configured to determine an appropriate water filter element (e.g., a filter element medium, a filter medium arrangement, a filter medium material, etc.) based on the combination of user inputs. For example, the system may determine, based on the geographical information that the user's water supply includes greater amounts of chlorine and to automatically adjust the amount of carbon fiber used in the water filter element to ensure chlorine is reduced to threshold levels that are required to maintain healthy skin. The system may be configured to take similar action in response to the user's susceptibility to certain contaminants. For example, the system is also configured to change the type of filter medium being used based on user-identified susceptibilities and to reduce certain contaminants to lower levels that required for the average person. The system may be configured to access lookup tables in system memory to identify classes of chemicals/materials and/or combinations and arrangements of materials that work well to filter user-identified contaminants.

(c) an application programming interface (API) that enables communication with other systems and networks to facilitate determination of tap water quality at the user's location. For example, the system may be configured to communicate or otherwise interface with websites or servers containing weather-related information, seasonal information (e.g., time of year), historical data (e.g., to identify what other people are ordering within the vicinity of the user that is geographically biased to their area and/or region), and/or other information relating to or affecting water quality. The system may also include artificial intelligence algorithms to facilitate determination of water quality by using historical data from users as a training set, recent weather or other events, and that facilitate water filter element selection based on user satisfaction, and other factors.

As previously described, the system may be configured to automatically/dynamically select and generate orders for a water filter element that is customized to the user's needs/desires, and to ship the water filter and/or water-dissolvable, skin treatment element to the user after receiving the user's request.

Method of Manufacture

Figure 8A:
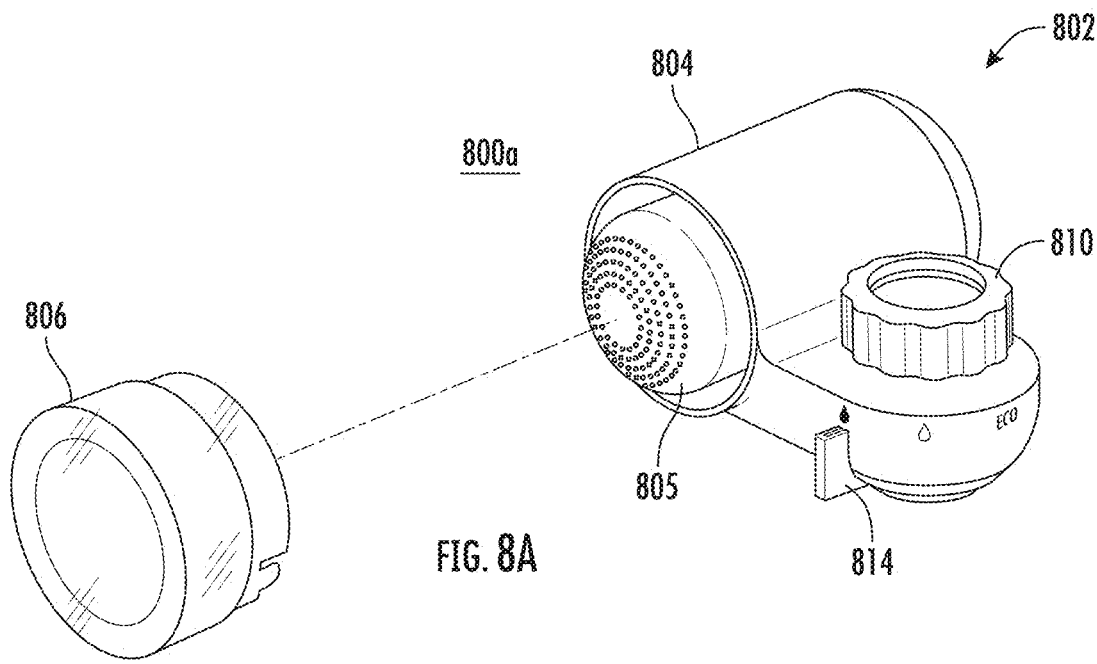
FIGS. 8A-8B are isometric views of an illustrative faucet water filter assembly showing various stages of assembly thereof.
Figure 8B:
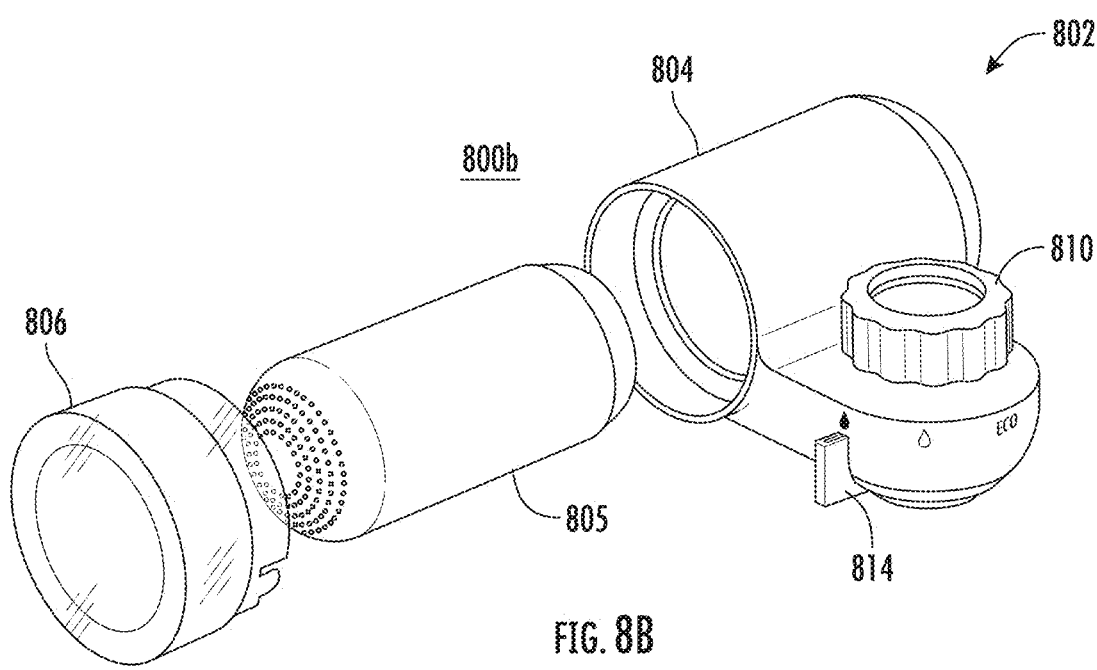
Figure 9A:
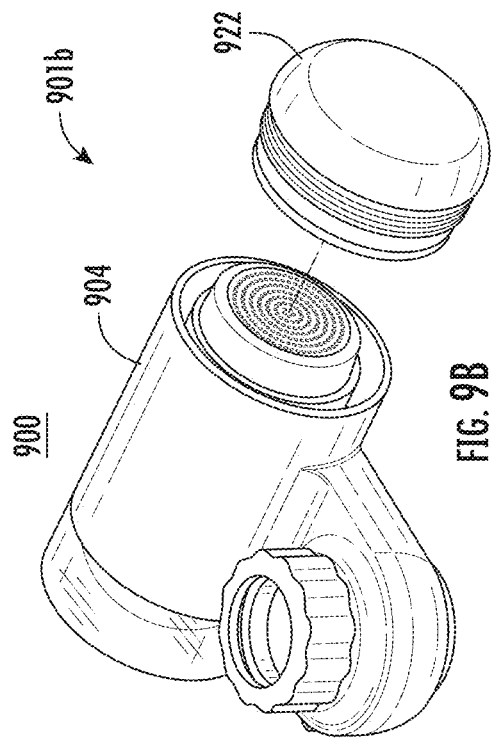
FIGS. 9A-9H are isometric views of an illustrative skin treatment element adapter that enables a water-dissolvable, skin treatment element to be disposed therein, and various stages of assembly thereof.
Figure 9B:
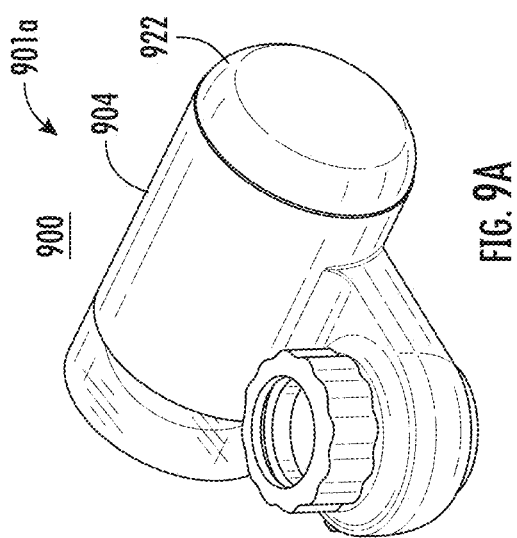
Figure 9C:
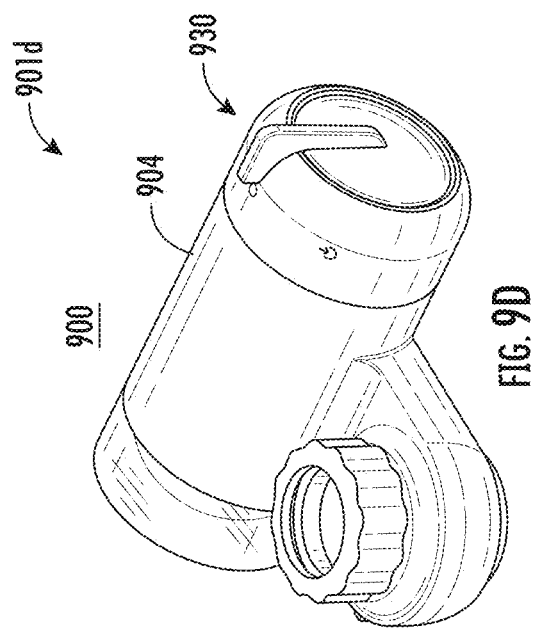
Figure 9D:
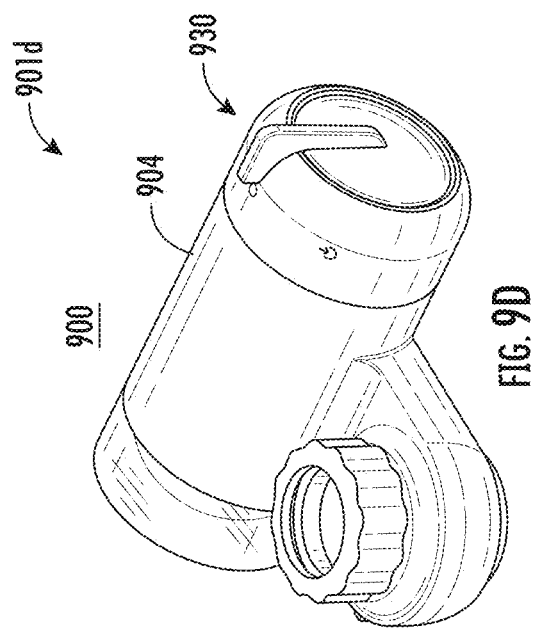
Figure 9E:
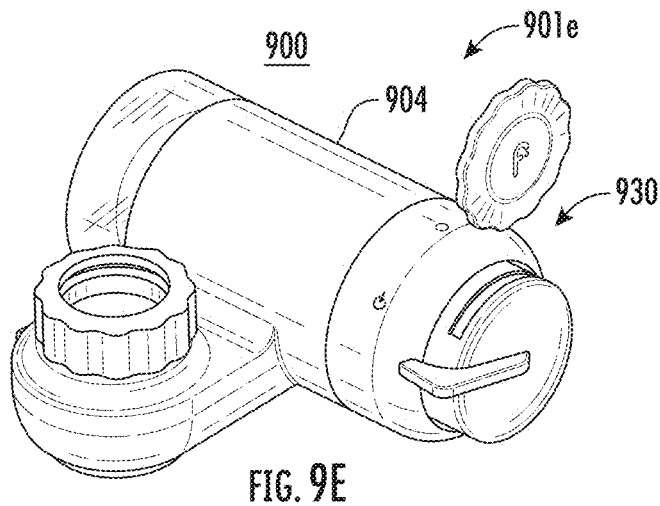
Figure 9F:
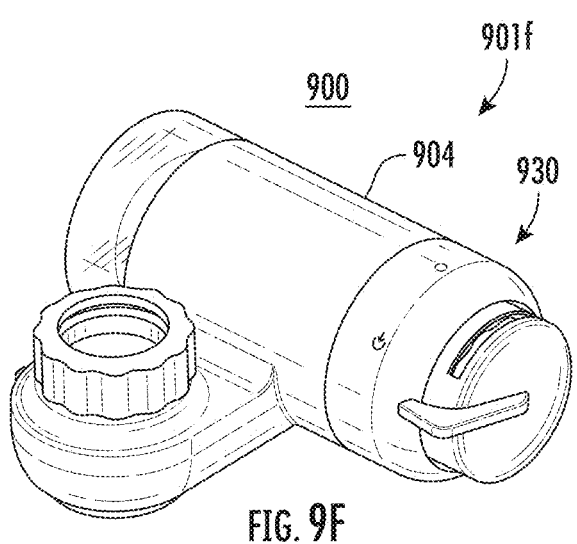
Figure 9G:
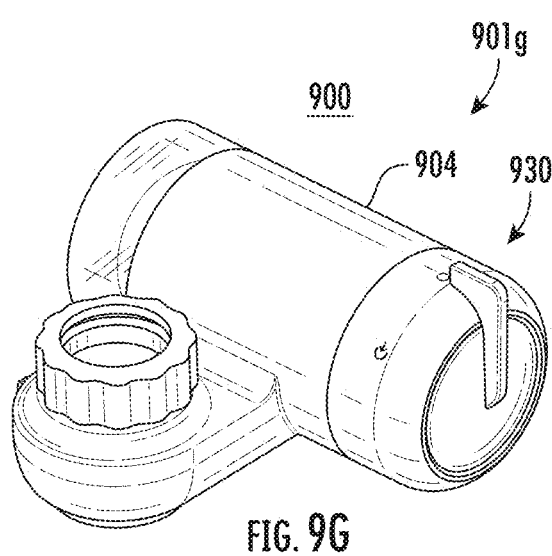
Figure 9H:
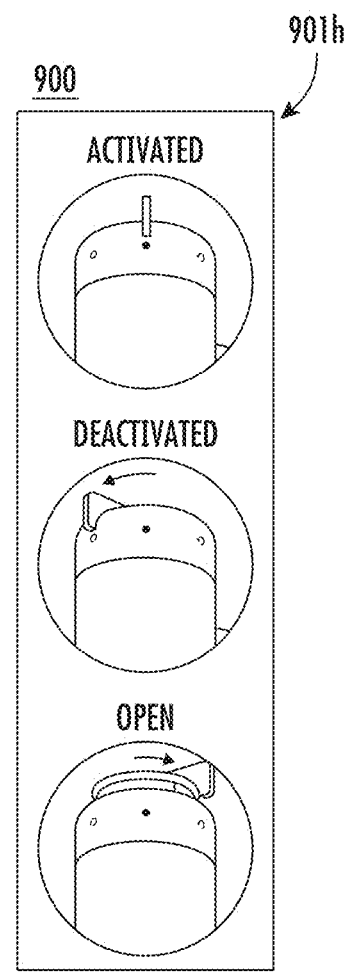
Figure 10A:
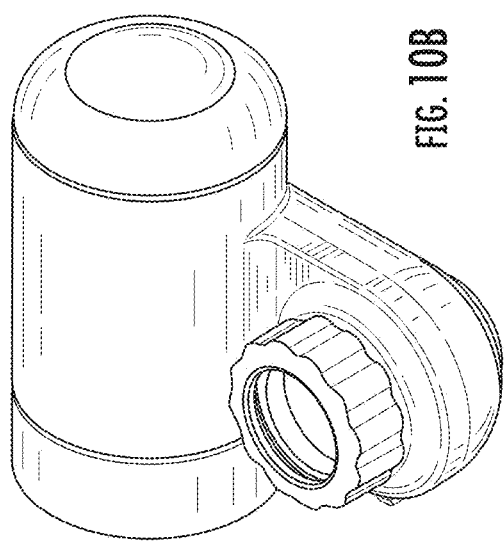
FIGS. 10A-10H are isometric, front, rear, top, bottom, and side views of an illustrative faucet water filter assembly.
Figure 10B:
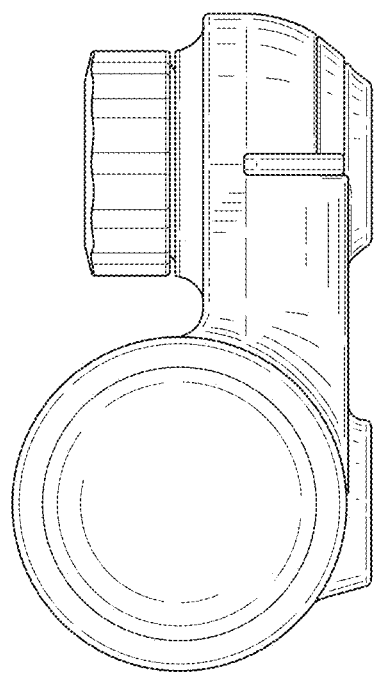
Figure 10C:
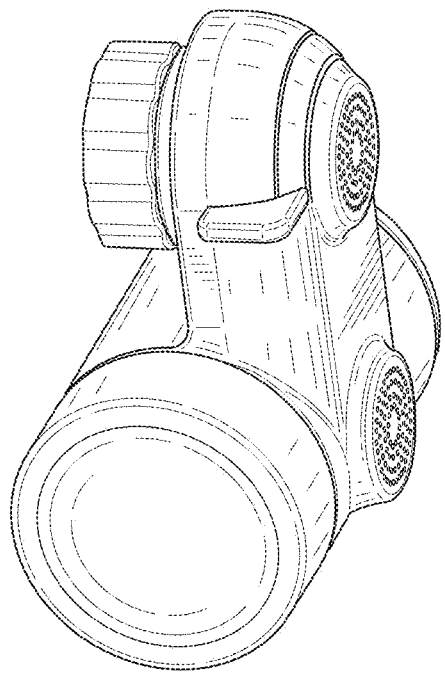
Figure 10D:
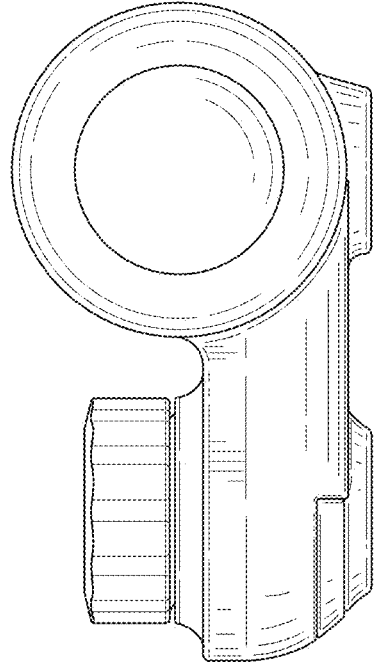
Figure 10E:
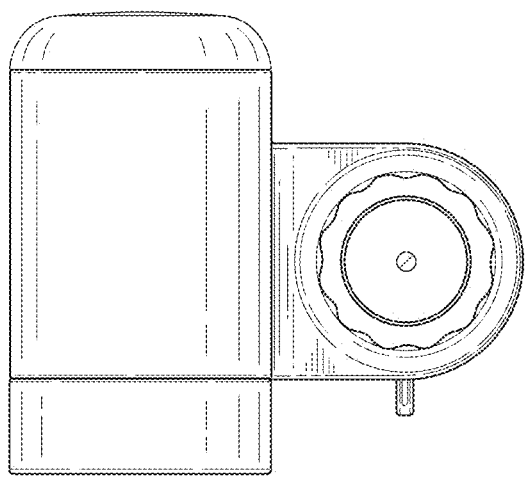
Figure 10F:
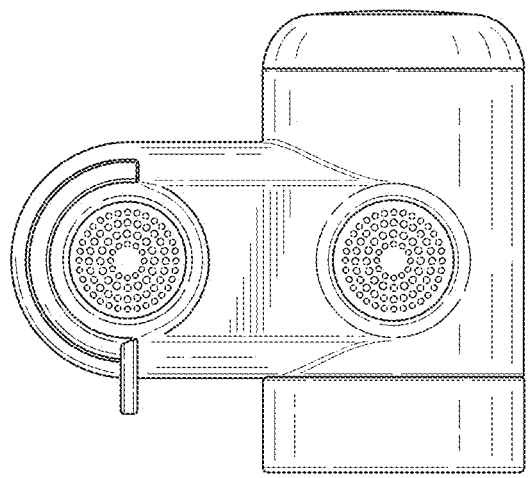
Figure 10G:
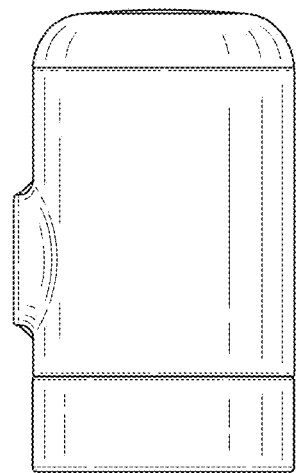
Figure 10H:
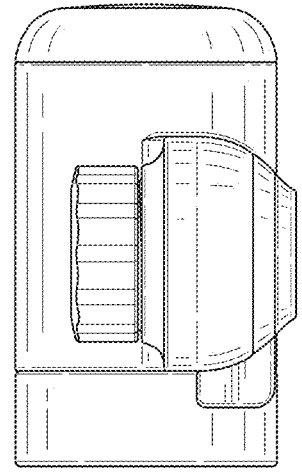
Figure 11A:
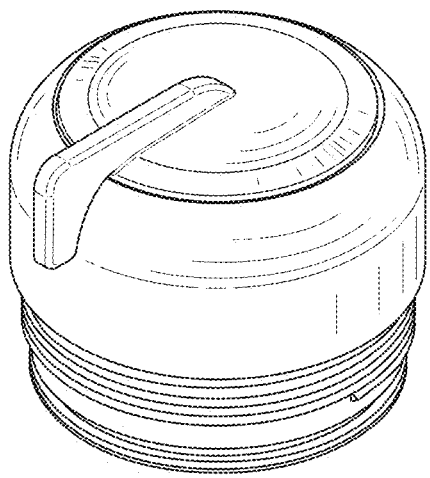
FIGS. 11A-11G are isometric, bottom, side, top rear, and front views of an illustrative skin treatment element adapter.
Figure 11B:
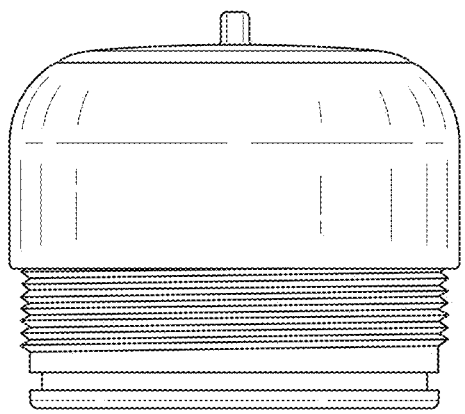
Figure 11C:
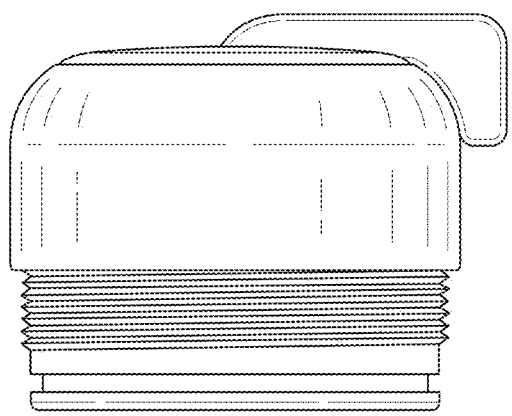
Figure 11D:
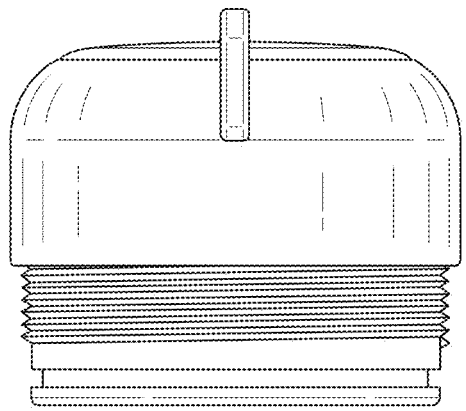
Figure 11E:
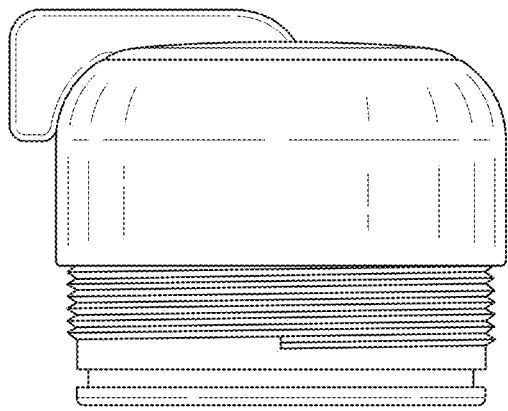
Figure 11G:
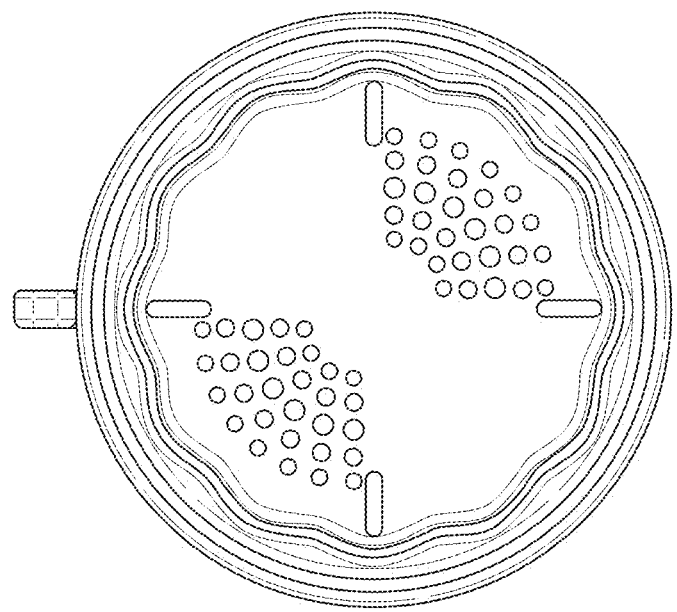
Figure 11F:
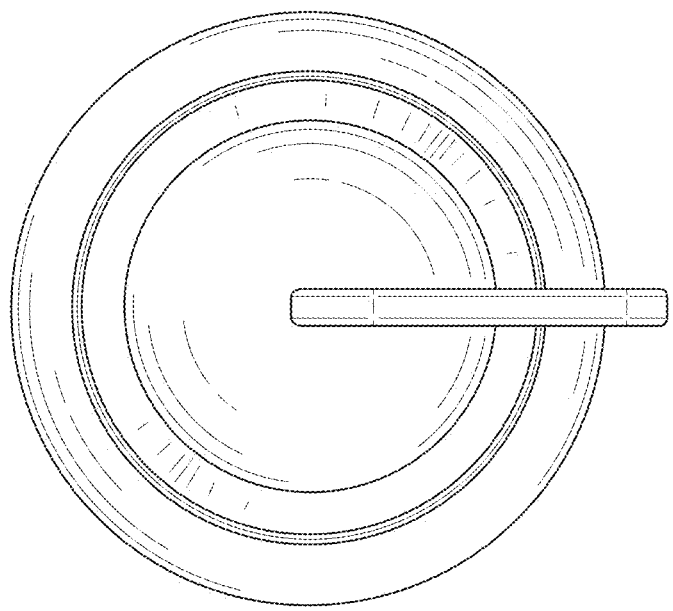
Figure 12A:
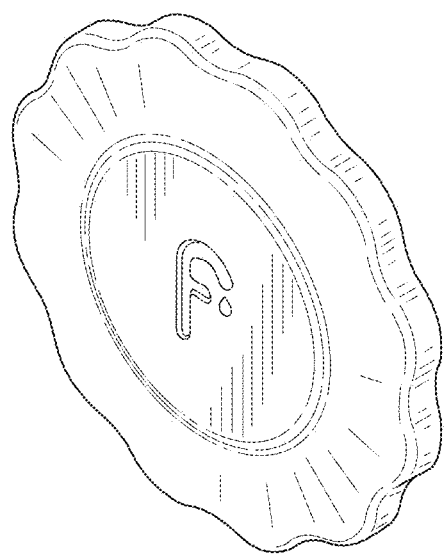
FIGS. 12A-12E are isometric, top, front, side, and rear views of an illustrative water-dissolvable, skin treatment element use with the faucet water filter assembly of FIGS. 11A-11H, for example.
Figure 12B:
Figure 12C:
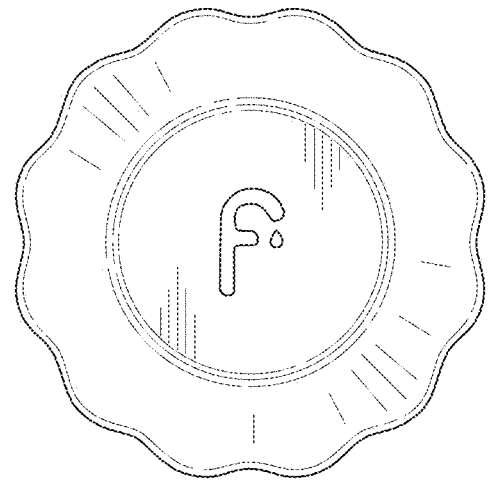
Figure 12D:
Figure 12E:
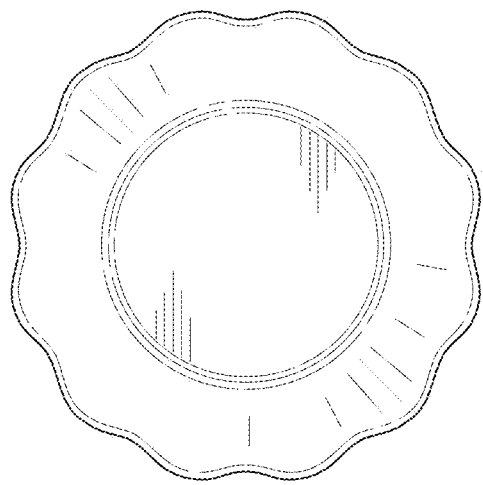
Figure 13A:
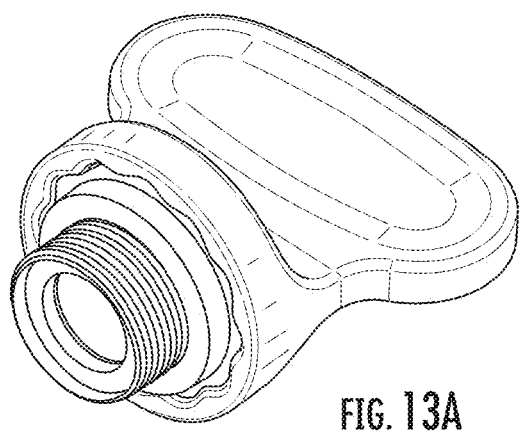
FIGS. 13A-13E are isometric, front, side, top, and rear views of an illustrative adapter replacement tool for a faucet water filter assembly.
Figure 13B:
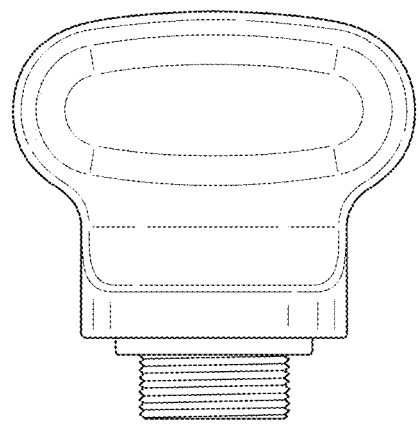
Figure 13C:
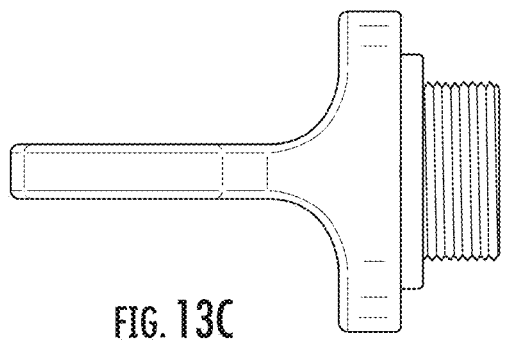
Figure 13D:
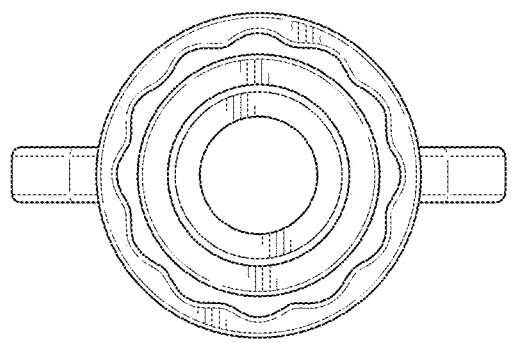
Figure 13E:
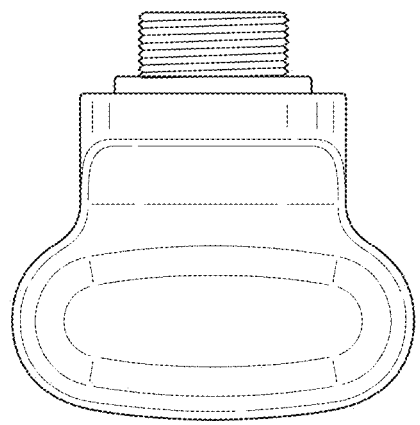
Figure 14C:
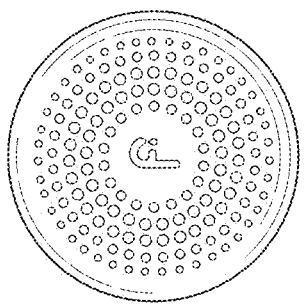
FIGS. 14A-14G are isometric, front, and side views of an illustrative water filter element for a faucet water filter assembly.
Figure 14B:
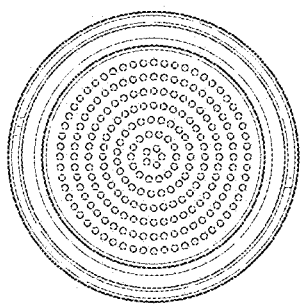
Figure 14A:
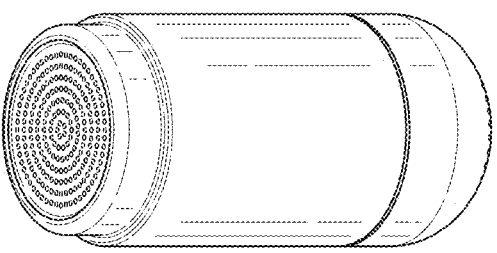
Figure 14G:
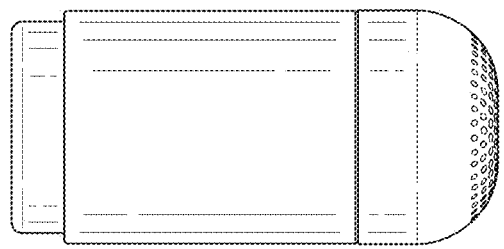
Figure 14F:
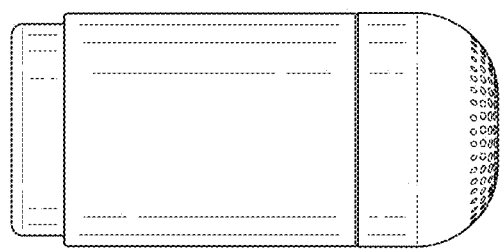
Figure 14E:
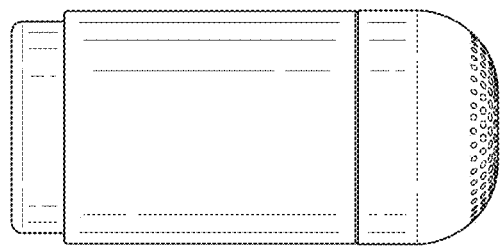
Figure 14D:
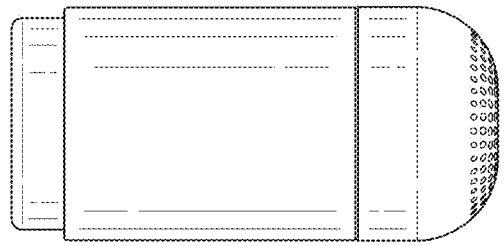

With regard to FIGS. 8A and 8B, isometric views of various stages of assembly 800*a* and 800*b* of an illustrative faucet water filter assembly 802 are shown. The water filter assembly 802 is configured with a housing 804 and a detachable front cover 806 if the filter assembly 802 is a front load water filter. A water filter 805 may be inserted into or removed from the housing 804, as shown. If the water filter assembly 802 were a rear load assembly, then the front cover 806 would remain attached to the housing 804 and a rear cover 822 may be removed to enable the filter 805 to be inserted and removed from the housing 804.

A method of manufacturing the faucet water filter assembly 800 may include providing the filter housing 804. The housing 804 may define an inlet having an inlet axis, and an interior cavity having a central axis oriented perpendicular to the inlet axis so as to receive a water filter element from a forward end of the filter housing. The method may include forming the filter housing out of plastic via an injection molding process in one or more pieces and coupling the pieces together to form the interior cavity. Alternative materials and manufacturing processes may be utilized. The method may further include aligning a faucet adapter with the inlet, coaxially with the inlet and inserting (e.g., by threading, etc.) the faucet adapter 810 into the filter housing 804. The method may also include coupling at least one mechanical actuator (e.g., knob, lever, etc.) 814 to the housing (or other feature), on an opposing side of the housing as the inlet so that the mechanical actuator may rotate about the inlet axis, where the mechanical actuator(s) 814 may provide for enabling water from a faucet to flow into the water filter 805 or prevent the water from flowing into the water filter 805 causing a valve to transition from an opened to a closed state.

With regard to FIGS. 9A-9H, isometric views of an illustrative skin treatment element adapter that enables a water-dissolvable, skin treatment element to be disposed therein, and various stages of assembly 901*a*-901*h* (collectively 901) thereof are shown. The skin treatment element adapter may replace a rear cover 922 of a housing 904 of a faucet water filter assembly 900*a*-900*h*.

One embodiment of a method of assembling the faucet water filter assembly 900 includes attaching a filter housing to a faucet or other water supply. The method may include aligning an inlet axis of an inlet of the filter housing with a faucet. The method may also include threadably engaging the filter housing, via a faucet adapter, to the faucet to sealingly engage the inlet with the faucet.

A method of installing a water filter element into the filter housing may include removing a forward cover from the housing that is disposed on a forward end of the housing (e.g., a forward end that is perpendicular to the inlet axis). The method may include rotating the forward cover relative to the housing and removing the cover to expose an opening to an interior cavity of the filter housing. The method may include removing the water filter element (e.g., a filter element housing) from the interior cavity, for example, by pulling the filter element housing along a longitudinal direction that is perpendicular to an inlet axis (e.g., a central axis of the inlet opening at which the filter housing connects to a faucet) and out through the forward end of the housing. The method may include inserting a new water filter element into the interior cavity and sealingly engaging the filter element housing with the filter housing. The method may also include aligning and re-engaging the forward cover with the housing at the forward opening, and securing the forward cover to the housing.

A method of installing a skin treatment element adapter onto the filter housing may include removing a rear cover from the housing (e.g., by rotating the rear cover with respect to the housing, etc.) to expose a rear opening of the interior cavity. The method may further include aligning a skin treatment element adapter with the interior cavity and coupling the skin treatment element adapter to the filter housing (e.g., by screwing the adapter onto the rear end of the housing in place of the rear cover, etc.).

A method of installing a water dissolvable, skin treatment element (e.g., a skin treatment disc, etc.) into the skin treatment element adapter may include actuating a knob, lever, or other mechanical actuator of the skin treatment element adapter to open a receiver element housing (e.g., to expose a slot or other opening along a radially extending sidewall of the receiver element housing, etc.), and inserting the treatment element into the receiver element housing (e.g., through the opening in the receiver element housing and into a receiving cavity defined by the receiver element housing). The method may include actuating the mechanical actuator of the skin treatment element adapter from an open position to a closed position to sealingly engage the receiver element housing with a housing interface body and/or with the filter housing.

Method of Operation

A method of operation of a faucet water filter assembly includes: activating a faucet to introduce tap water into a filter body of the faucet water filter assembly; adjusting a first mechanical actuator from an unfiltered/tap water setting to a filtered water setting to redirect tap water through a water filter element within the filter body; and/or activating a skin treatment element adapter to direct clean, filtered water, across a water-dissolvable, skin treatment element (e.g., a skin treatment disc made from a skin treatment ingredient, etc.). The method may include rotating a second mechanical actuator about a central axis of the interior cavity of the filter housing to fluidly couple the interior cavity with a receiving cavity that contains the water-dissolvable, skin treatment element.

With regard to FIGS. 10A-10H, isometric, front, rear, top, bottom, and side views of an illustrative faucet water filter assembly are shown.

With regard to FIGS. 11A-11G, isometric, bottom, side, top rear, and front views of an illustrative skin treatment element adapter for use with a faucet water filter assembly are shown.

With regard to FIGS. 12A-12E, isometric, top, front, side, and rear views of an illustrative treatment element for use in a skin treatment element adapter of a faucet water filter assembly are shown.

With regard to FIGS. 13A-13E, isometric, front, side, top, and rear views of an illustrative adapter replacement tool for securing a faucet water filter assembly to a faucet are shown.

With regard to FIGS. 14A-14G, isometric, front, and side views of an illustrative water filter element for a faucet water filter assembly are shown.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While the instant disclosure has been described above according to its preferred embodiments, it can be modified within the spirit and scope of this disclosure. This application is therefore intended to cover any variations, uses, or adaptations of the instant disclosure using the general principles disclosed herein. Further, the instant application is intended to cover such departures from the present disclosure as come within the known or customary practice in the art to which this disclosure pertains.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It is noted that any element disclosed in one embodiment may be incorporated or utilized with any other embodiment disclosed herein.

What is claimed is:

1. A faucet water filter assembly, comprising:
    a water faucet inlet interface defining an inlet opening having an inlet central axis;
    a water conduit fluidly connected with the water faucet inlet interface;
    a filter body horizontally offset from the water faucet inlet interface, the filter body having a horizontal orientation that is perpendicular to the inlet central axis, the filter body fluidly connected with the water conduit to receive water flowing through the water conduit from the water faucet inlet interface to filter the water by a filter element to produce filtered water, the filter body at least partially defining a first nozzle that is configured to dispense the filtered water from the assembly in a direction parallel to the inlet central axis; and
    a cover disposed at a first end of the filter body, the cover configured to open and close to enable the filter element to be inserted and removed from the filter body, and when in a closed state, cause the water flowing through the filter body to flow through the filter element, the cover having a transparent or translucent sidewall protruding axially from the first end of the filter body relative to a central axis of the filter body, the cover and a sidewall of the filter element together defining a channel for water flow therethrough, the channel extending axially from the filter body and into an end of the filter element, the channel being visible through both a side of the cover and a front of the cover when the filter element is installed within the filter body and the cover.

2. The faucet water filter assembly of claim 1, further comprising a skin treatment element adapter coupled to the filter body and configured to introduce a water-dissolvable, skin treatment element to water flow passing through the filter body.

3. The faucet water filter assembly of claim 1, wherein the filter body defines an interior cavity configured to receive the filter element therein, a central axis of the interior cavity oriented substantially perpendicular to the inlet central axis, the filter element including a housing configured to engage an internal feature of the filter body to cause the water that enters the filter body to pass through the filter element so as to become the filtered water.

4. The faucet water filter assembly of claim 1, wherein the water conduit extends at least partially normal to the inlet central axis to enable water to flow from the water faucet inlet interface to the filter body.

5. The faucet water filter assembly of claim 4, wherein the filter body is fluidly coupled to the water conduit so that that water entering the filter body from the water conduit is directed along a flow path to flow in a direction from the first end of the filter body toward a second end of the filter body opposite the first end.

6. The faucet water filter assembly of claim 5, wherein the flow path extends from the cover.

7. The faucet water filter assembly of claim 1, further comprising a housing portion defining a second nozzle that is parallel with or coaxially aligned with the inlet central axis, the housing portion coupled to both the water faucet inlet interface and the water conduit.

8. The faucet water filter assembly of claim 7, further comprising:
    a control device disposed at the housing portion; and
    a valve configured to be actuated by the control device, the valve actuatable between a first position in which the valve fluidly couples the water faucet inlet interface to the first nozzle to cause the filtered water to be dispensed from the first nozzle, and a second position in which the valve fluidly couples the water faucet inlet interface to the second nozzle to cause the water to be dispensed from the second nozzle.

9. The faucet water filter assembly of claim 8, wherein the control device is a control lever that rotates about the housing portion.

10. The faucet water filter assembly of claim 8, wherein the valve is actuatable between at least three preset positions including a third position in which the valve fluidly couples the water faucet inlet interface with the second nozzle, the valve, when in the third position, is configured to limit a maximum flow rate through the second nozzle to a lower flow rate relative to when the valve is in the second position.

11. The faucet water filter assembly of claim 8, wherein the control device is configured to rotate about the inlet central axis.

12. The faucet water filter assembly of claim 7, wherein the first nozzle is defined by a bottom portion of the filter body and is disposed at a central position between the first end of the filter body and a second end of the filter body opposite from the first end.

13. The faucet water filter assembly of claim 7, wherein an outer surface of the filter body that defines the first nozzle is co-planar with an outer surface of the housing portion that defines the second nozzle.

14. The faucet water filter assembly of claim 7, wherein the first nozzle is defined by a first perforated wall portion of the filter body.

15. The faucet water filter assembly of claim 14, wherein the second nozzle is defined by a second perforated wall portion of the housing portion, the first nozzle having the same outer dimension as the second nozzle.

16. The faucet water filter assembly of claim 7, wherein the water faucet inlet interface is defined by at least part of the housing portion.

17. The faucet water filter assembly of claim 1, wherein the first end is a front end facing a user positioned at a front of a sink at which the faucet water filter assembly is installed.

18. The faucet water filter assembly of claim 1, wherein the filter body defines an interior cavity configured to receive the filter element therein, wherein the faucet water filter assembly further includes a second cover removably coupled a second end of the filter body opposite the first end, the second cover configured to open and close to enable access to the interior cavity.

19. The faucet water filter assembly of claim 1, further comprising a skin treatment element adapter, the skin treatment element adapter comprising:
a housing interface body coupled to the filter body and including a first interface portion; and
an element receiving body movably coupled to the housing interface body, the element receiving body moveable between a closed position and an open position to enable a skin treatment element to be inserted therein, the element receiving body including a second interface portion disposed adjacent to the first interface portion, the first interface portion selectably repositionable relative to the second interface portion to fluidly couple the element receiving body to the housing interface body.

20. The faucet water filter assembly of claim 19, wherein at least one of the element receiving body and the housing interface body includes a wall movably positioned to enable water to enter the element receiving body.

21. The faucet water filter assembly of claim 20, wherein the wall is defined by a rotatable disc having an open portion that, when aligned with one another, enables water to flow into and out of the element receiving body.

22. The faucet water filter assembly of claim 19, wherein the element receiving body defines a slot for receiving the skin treatment element into the element receiving body.

23. The faucet water filter assembly of claim 1, wherein the cover is a cylindrical cover, an outer dimension of the sidewall is approximately the same as the outer dimension of the filter body, and the cylindrical cover extends coaxially with the filter body so that a user may view (i) water flow passing in a substantially axial direction along a first channel portion of the channel through the sidewall of the cover, and (ii) water flow passing in a substantially radial direction along a second channel portion of the channel that extends from the first channel portion through an end wall of the cover.

24. The faucet water filter assembly of claim 1, wherein the filter body and the filter element define at least two flow paths between the filter element and the filter body when the filter element is installed within the filter body, the at least two flow paths comprising:
a first flow path for water entering the filter body from the water faucet inlet interface that extends from an intermediate position of the filter body between opposing ends of the filter body a first axial end of the filter element; and
a second flow path for water leaving the filter body that extends from a second axial end of the filter element that opposes the first axial end back toward the intermediate position.

* * * * *